(12) United States Patent
Synstelien et al.

(10) Patent No.: US 11,558,264 B1
(45) Date of Patent: Jan. 17, 2023

(54) FACILITATING AND PROVISIONING CUSTOMER BROADBAND TRANSPORT SERVICE

(71) Applicant: ReadyLinks Inc., Chanhassen, MN (US)

(72) Inventors: Justin L. Synstelien, Chanhassen, MN (US); Brady M. Synstelien, Chanhassen, MN (US); Alec R. Synstelien, Chanhassen, MN (US); Garrett D. Synstelien, Chanhassen, MN (US); Larry D. Synstelien, Chanhassen, MN (US)

(73) Assignee: ReadyLinks Inc., Chanhassen, MN (US)

( * ) Notice: Subject to any disclaimer, the term of this patent is extended or adjusted under 35 U.S.C. 154(b) by 0 days.

(21) Appl. No.: 17/804,161

(22) Filed: May 26, 2022

Related U.S. Application Data

(60) Provisional application No. 63/203,140, filed on Jul. 9, 2021.

(51) Int. Cl.
| | |
|---|---|
| *H04L 41/00* | (2022.01) |
| *H04L 12/28* | (2006.01) |
| *H04L 41/0806* | (2022.01) |
| *H04L 41/5061* | (2022.01) |

(52) U.S. Cl.
CPC .......... *H04L 41/32* (2013.01); *H04L 12/2801* (2013.01); *H04L 41/0806* (2013.01); *H04L 41/5061* (2013.01)

(58) Field of Classification Search
CPC . H04L 41/32; H04L 12/2801; H04L 41/0806; H04L 41/5061

USPC ........................................................ 709/223
See application file for complete search history.

(56) References Cited

U.S. PATENT DOCUMENTS

| | | | |
|---|---|---|---|
| 1,342,472 A | 6/1920 | Synstelien | |
| 6,275,990 B1 | 8/2001 | Dapper et al. | |
| 7,812,766 B2 * | 10/2010 | Leblanc | G01C 21/206 |
| | | | 701/408 |
| 7,979,518 B2 * | 7/2011 | Barnhouse | H04M 3/42136 |
| | | | 379/15.02 |
| 8,156,246 B2 | 4/2012 | Short et al. | |
| 9,087,319 B2 * | 7/2015 | Nguyen | H04L 12/185 |
| 9,380,646 B2 * | 6/2016 | Cui | H04W 48/18 |
| 10,355,989 B1 * | 7/2019 | Panchal | H04L 67/10 |

(Continued)

FOREIGN PATENT DOCUMENTS

| | | |
|---|---|---|
| EP | 1050163 | 11/2000 |
| FR | 2990091 | 11/2013 |

OTHER PUBLICATIONS

"U.S. Appl. No. 17/804,162, Non Final Office Action dated Aug. 18, 2022", 5 pgs.

(Continued)

*Primary Examiner* — Melvin H Pollack
(74) *Attorney, Agent, or Firm* — Schwegman Lundberg & Woessner, P.A.

(57) ABSTRACT

A system and method for facilitating and provisioning customer broadband transport service between a digital communication port employing digital communications and at least one communications provider, including communicating with a provisioning server to establish service and to coordinate service offerings of one or more communication providers.

30 Claims, 23 Drawing Sheets

(56) References Cited

U.S. PATENT DOCUMENTS

| | | | |
|---|---|---|---|
| 10,476,684 B2 | 11/2019 | Hartnett et al. | |
| 10,904,108 B2 | 1/2021 | Schwengler et al. | |
| 11,218,424 B1* | 1/2022 | Hanahan | H04L 67/10 |
| 2004/0015405 A1 | 1/2004 | Cloutier et al. | |
| 2006/0078093 A1 | 4/2006 | Karam et al. | |
| 2006/0080573 A1 | 4/2006 | Biederman et al. | |
| 2006/0164108 A1 | 7/2006 | Herbold | |
| 2006/0171399 A1 | 8/2006 | Ferentz et al. | |
| 2008/0201748 A1* | 8/2008 | Hasek | G06F 21/10 725/111 |
| 2009/0298470 A1* | 12/2009 | Huber | H04W 36/32 455/411 |
| 2010/0027469 A1* | 2/2010 | Gurajala | H04M 15/8038 370/328 |
| 2010/0071020 A1* | 3/2010 | Addington | H04H 20/78 725/132 |
| 2010/0192212 A1* | 7/2010 | Raleigh | G06Q 40/00 726/7 |
| 2010/0205652 A1* | 8/2010 | Bouchard | G06Q 30/0255 707/769 |
| 2010/0217837 A1* | 8/2010 | Ansari | H04L 12/2814 709/224 |
| 2010/0271951 A1* | 10/2010 | Dujardin | H04L 63/0272 370/316 |
| 2010/0318918 A1* | 12/2010 | Mahmoodshahi | H04L 45/00 715/752 |
| 2011/0093913 A1* | 4/2011 | Wohlert | H04L 63/0861 726/1 |
| 2011/0103371 A1* | 5/2011 | Russell | H04L 41/147 370/352 |
| 2011/0176666 A1* | 7/2011 | Reding | H04M 3/54 379/93.01 |
| 2012/0036220 A1* | 2/2012 | Dare | H04L 67/04 709/217 |
| 2012/0096513 A1* | 4/2012 | Raleigh | H04L 41/0816 709/224 |
| 2012/0317426 A1 | 12/2012 | Hunter, Jr. et al. | |
| 2015/0055608 A1* | 2/2015 | Egner | H04W 4/025 370/329 |
| 2015/0347683 A1* | 12/2015 | Ansari | G16H 10/60 726/7 |
| 2016/0249223 A1* | 8/2016 | Egner | H04W 16/14 |
| 2016/0273722 A1 | 9/2016 | Crenshaw | |
| 2016/0373588 A1* | 12/2016 | Raleigh | H04L 12/1407 |
| 2017/0250828 A1 | 8/2017 | Buchanan | |
| 2017/0325141 A1* | 11/2017 | Laliberte | H04W 80/08 |
| 2017/0351309 A1 | 12/2017 | Hartnett et al. | |
| 2018/0219635 A1 | 8/2018 | Sipes, Jr. | |
| 2018/0233862 A1 | 8/2018 | Brennan et al. | |
| 2019/0230181 A1* | 7/2019 | Wang | G06F 9/451 |
| 2019/0260879 A1* | 8/2019 | Raleigh | H04M 15/83 |
| 2019/0361509 A1 | 11/2019 | Boban | |
| 2020/0067720 A1 | 2/2020 | Hartnett et al. | |
| 2020/0225655 A1* | 7/2020 | Cella | G05B 23/024 |
| 2021/0075520 A1 | 3/2021 | Soto et al. | |
| 2021/0218571 A1* | 7/2021 | Ansari | H04M 15/705 |
| 2022/0014512 A1* | 1/2022 | Raleigh | H04L 63/20 |
| 2022/0116793 A1* | 4/2022 | Osinski | H04L 12/14 |

OTHER PUBLICATIONS

"International Application Serial No. PCT US2022 073552, International Search Report dated Oct. 11, 2022", 4 pgs.

"International Application Serial No. PCT US2022 073552, Written Opinion dated Oct. 11, 2022", 7 pgs.

"International Application Serial No. PCT US2022 073555, International Search Report dated Oct. 24, 2022", 5 pgs.

"International Application Serial No. PCT US2022 073555, Written Opinion dated Oct. 24, 2022", 7 pgs.

"BT PLC Request to extend scope of DTS 101 548-1", ETSI Draft, ATTMTM6(18)000042, European Telecommunications Standards Institute (ETSI), 650, Route Des Lucioles, F-06921 Sophia Antipolis, France vol. WG ATTM TM6 Hireline Access Network System, docbox.etsi.org ATTM TM6 05-CONTRIBUTIONS 2018 ATTMTM6(18)000042_Request_to_extend_scope_of_DTS_101_548, (Sep. 26, 2018), 1-2.

"U.S. Appl. No. 17/804,162, Response filed Nov. 15, 2022 to Non Final Office Action dated Aug. 18, 2022", 17 pgs.

* cited by examiner

Fig. 15

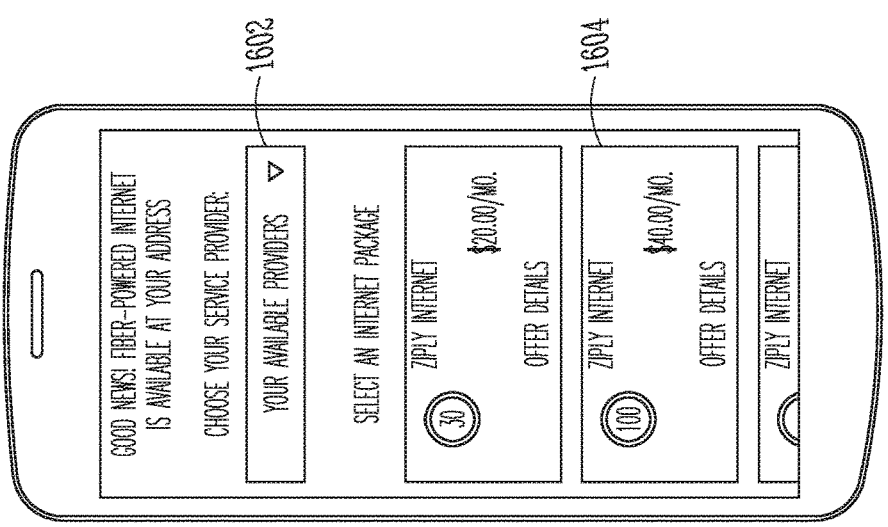
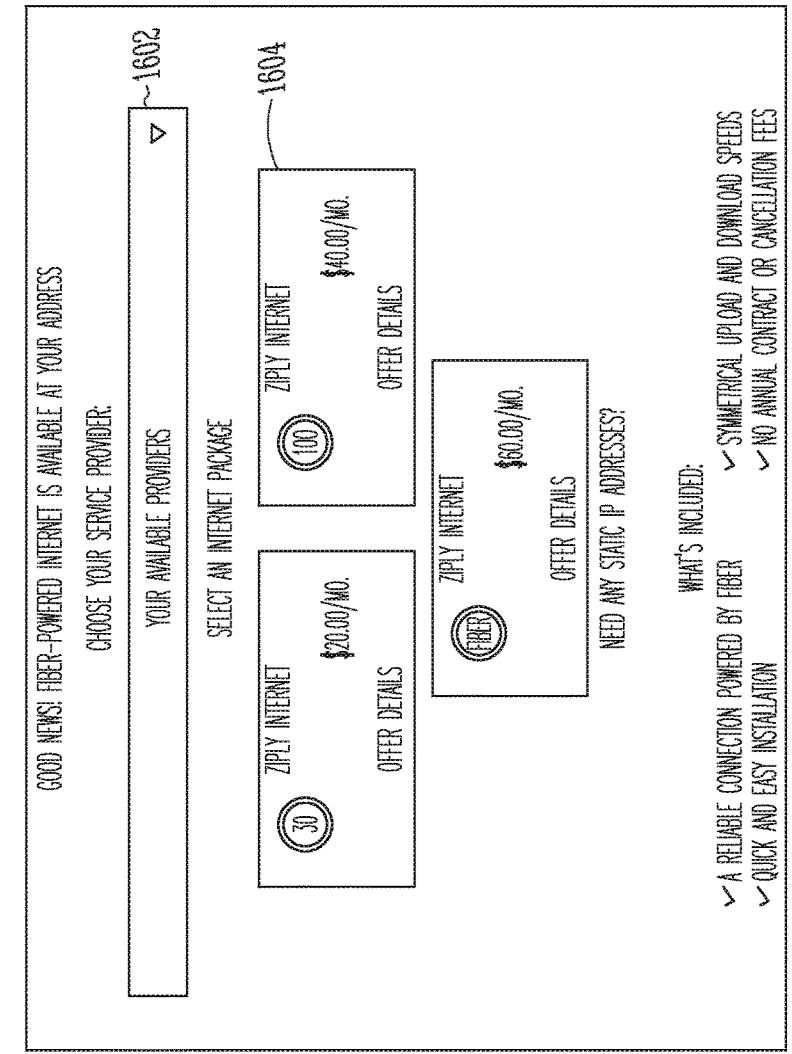
Fig. 16

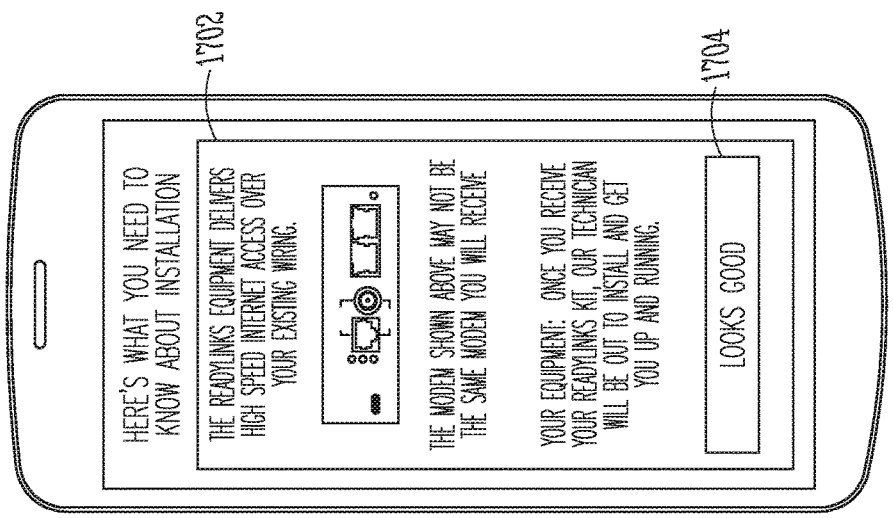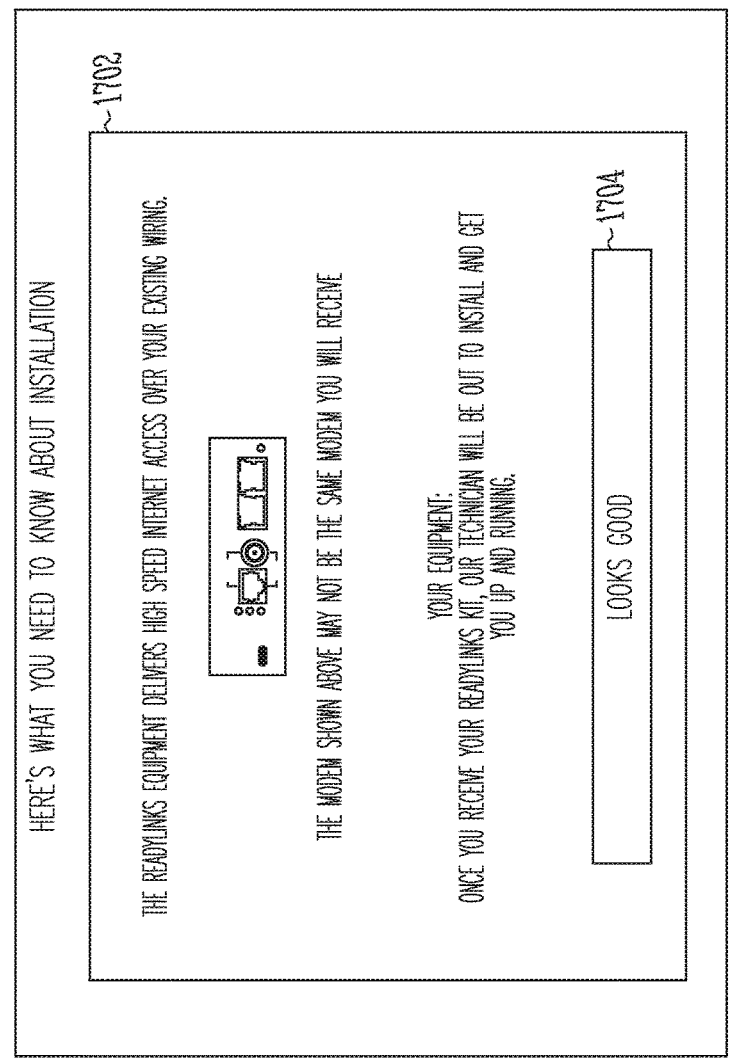
Fig. 17

Fig. 18

ORDER INFORMATION

ORDER INFORMATION

TRANSACTION SUMMARY

UP TO 30/30 MBPS
MONTHLY RECURRING CHARGE $20.00
TAXES $0.00
TOTAL MONTHLY CHARGES $20.00

DETAILED DESCRIPTION OF CHARGES:

~1902

PAYMENT INFORMATION
TOTAL: $20.00

CARD NUMBER    MM/YY CVC

☐ I HAVE READ AND ACCEPT THE READYON HIGH-SPEED INTERNET SUBSCRIBER AGREEMENT

REFERRAL CODE

COMPLETE PURCHASE ~1906

FACILITATING AND PROVISIONING CUSTOMER BROADBAND TRANSPORT SERVICE

CROSS REFERENCE TO RELATED APPLICATIONS

This application claims the benefit under 35 U.S.C. § 119(e) of U.S. Provisional Patent Application 63/203,140, filed Jul. 9, 2021, the disclosure of which is hereby incorporated by reference herein in its entirety.

This application is related to commonly assigned, U.S. Provisional Patent Application Ser. No. 63/203,141, entitled "BIDIRECTIONAL POWER FEED DIGITAL COMMUNICATION DEVICE", filed on Jul. 9, 2021, which is hereby incorporated by reference in its entirety.

BACKGROUND

Subscribers of digital communications at a residence or business (the "service location") have a number of options based on the connection options available at the service location. Traditional communications employ cable, fiber, wireless, and plain-old-telephone connection options. Each subscriber service provider has challenges deploying service to new subscribers and existing subscribers who request new service.

Cable and fiber networks require a cable and/or fiber drop at the service location to establish a digital connection. Cellular and satellite networks require wireless equipment for digital access. Conventional telephone lines can be used with modems supporting DSL (digital subscriber loop) communications. However, each service typically involves substantial installation and programming to ensure the subscriber has a proper connection.

Conventional wireless network services suffer from the issues commonly found with wireless networks, such as signal dropout, fading, interference, and relatively modest uplink transmission rates. Different networks may offer vastly different service connections depending on the connection options at a particular location. Conventional digital cable or optical fiber systems provide relatively fast communications but typically require a large capital investment associated with installing and maintaining cable and fiber networks and provisioning services to users.

Conventional plain telephone lines typically supported substantially lower communications speeds than cable systems and may employ DSL (digital subscriber loop) communications featuring additional overhead for provisioning access both by virtue of equipment and establishing services to users.

These services typically required a technician to visit the location to install necessary equipment and to ensure signal strength and connections were adequate for the desired service. Accordingly, such technician visits involved service delay to coordinate with the subscriber and for technician personnel to be deployed to ensure connection.

There is a need in the art for a system for easily and quickly deploying and provisioning high speed digital communications to users at residential and commercial locations. Such a system should be easy and efficient to set up and use. Such a system should provide the subscriber a variety of subscription and connection options, preferably minimizing or reducing the delays, difficulties, and cost associated with scheduling a technician to visit the service location to establish service.

SUMMARY

The present subject matter provides a system and method for facilitating and provisioning customer broadband transport service to establish high speed digital access to a service location. The present subject matter provides hardware and software for setting up a subscriber's access using a server based digital service connection software that affords a subscriber a variety of service options from a plurality of service providers using a plurality of payment options and payment processors.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present patent application.

FIGS. 13-22 show examples of various onboarding screens available to a subscriber for establishing digital communications using the digital communications port of the present subject matter according to one embodiment of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Figure 1:
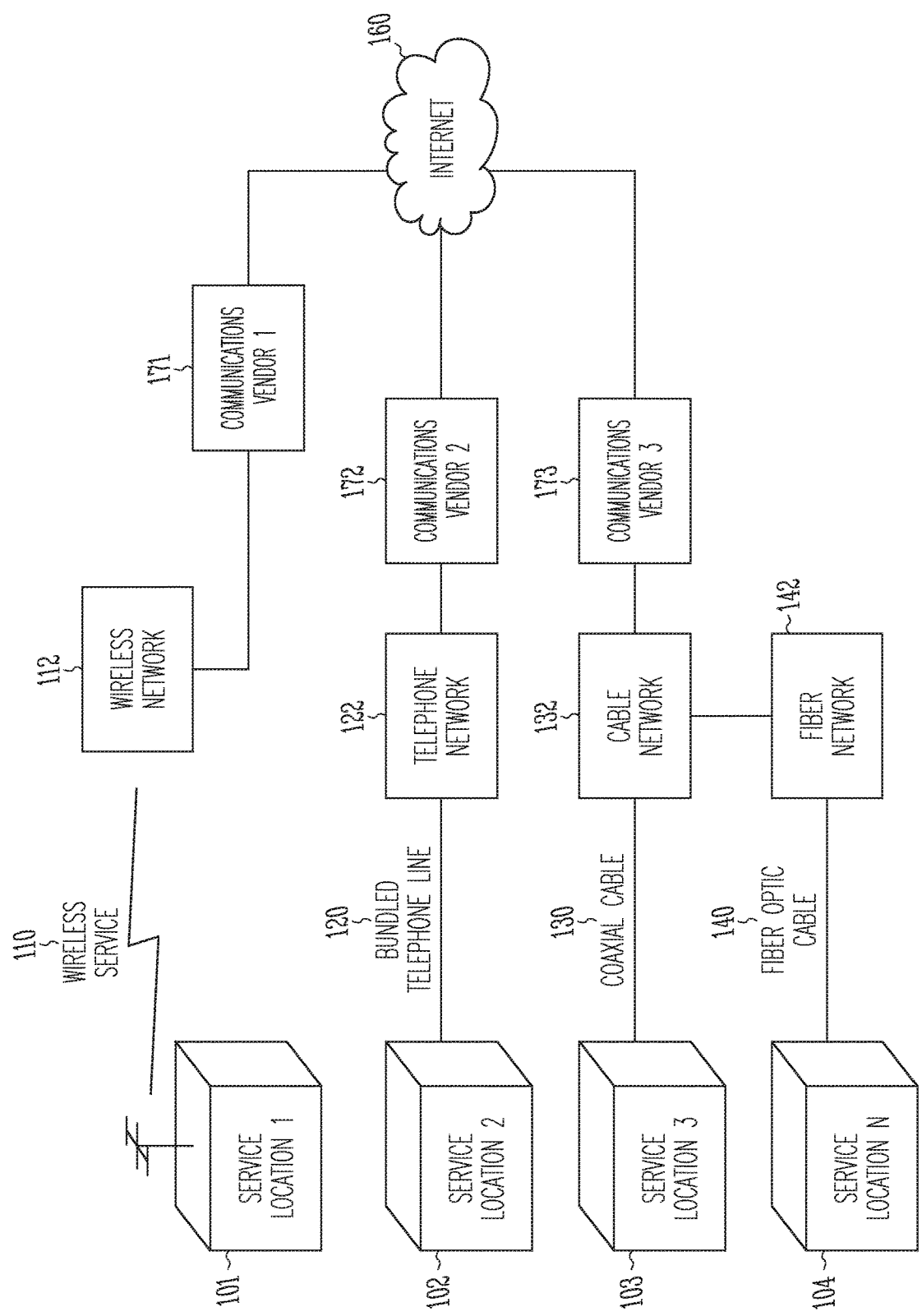
FIG. 1 illustrates a communications environment in which the present subject matter may be practiced.

FIG. 1 illustrates a communications environment in which the present subject matter may be practiced. The communications environment 100 may include a number of service locations 101, 102, 103, 104. A plurality of service locations may be used or deployed using the present subject matter. The service locations 101, 102, 103, 104 represent examples of locations of subscribers of digital communications at a residence or business. The service locations 101, 102, 103, 104 may have a number of options for digital communications based on the connection options available at the service location. Each location may include one or more communications options employing cable, fiber, wireless, and telephone connection options. In the exemplary embodiments, service location 101 has wireless service 110 for digital communications connected to a wireless network 112 to provide access to the internet 160. Service location 102 has bundled telephone lines 120 for digital communications connected to a telephone network 122 to provide access to the internet 160. Service location 103 has coaxial cable 130 for digital communications connected to a cable network 132 to provide access to the internet 160. Service location 104 has fiber optic cable 140 for digital communications connected to a cable network 132 via a fiber network 142 to provide access to the internet 160.

In various embodiments, one or more service locations 101, 102, 103, 104 may include more than one option for connection to the internet 160. For example, a service location may include any combination of wireless 110, telephone lines 120, coaxial cables 130 and fiber optic cables 140, and a user at such a service location may select the type of connection based on availability, cost, speed, preferred vendor, and/or personal preference. A number of communication vendors 171, 172, 173 (or subscribers service providers) may be available to enable access to the internet 160 from the one or more service locations 101, 102, 103, 104. Each subscriber service provider has challenges deploying service to new subscribers and existing subscribers who request new service.

Figure 2:
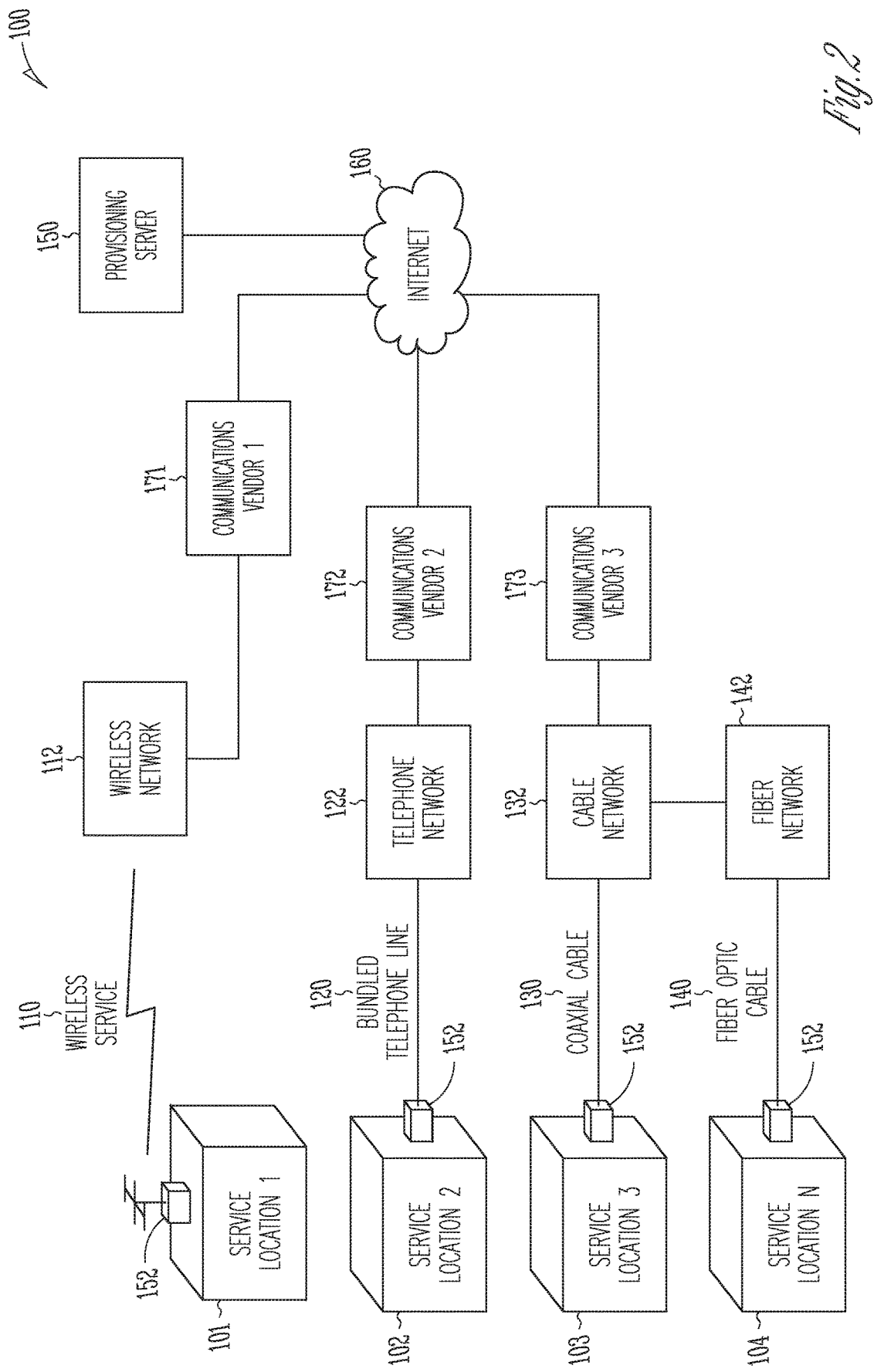
FIG. 2 illustrates various deployments of a digital communications port of the present subject matter according to various embodiments of the present subject matter.

FIG. 2 illustrates various deployments of a digital communications port 152 of the present subject matter according to various embodiments of the present subject matter. A user at a service location 101, 102, 103, 104 may be provided with a digital communications port 152 of the present subject matter, such as the digital communications port 152 shown in FIGS. 6-7. The digital communications port 152 includes one or more inputs for connecting to available connection options at the service location. For example, the digital communications port 152 may include inputs compatible with wireless service 110, inputs compatible with bundled telephone lines 120, inputs compatible with coaxial cables 130, and/or inputs compatible with fiber optic cables 140. The user may connect the digital communications port 152 to one or more of the connections at a given service location, in various embodiments. When connecting the digital communications port 152, the user may access an application or software (such as the application and software depicted in FIGS. 13-22) from a user's computer or personal device to interface with a provisioning server 150 over the internet 160. As will be shown in greater detail below, the provisioning server 150 interacts with the digital communications port 152 to provision the available connection resources at the service location 101, 102, 103, 104 to provide an internet connection for the user.

Figure 3:
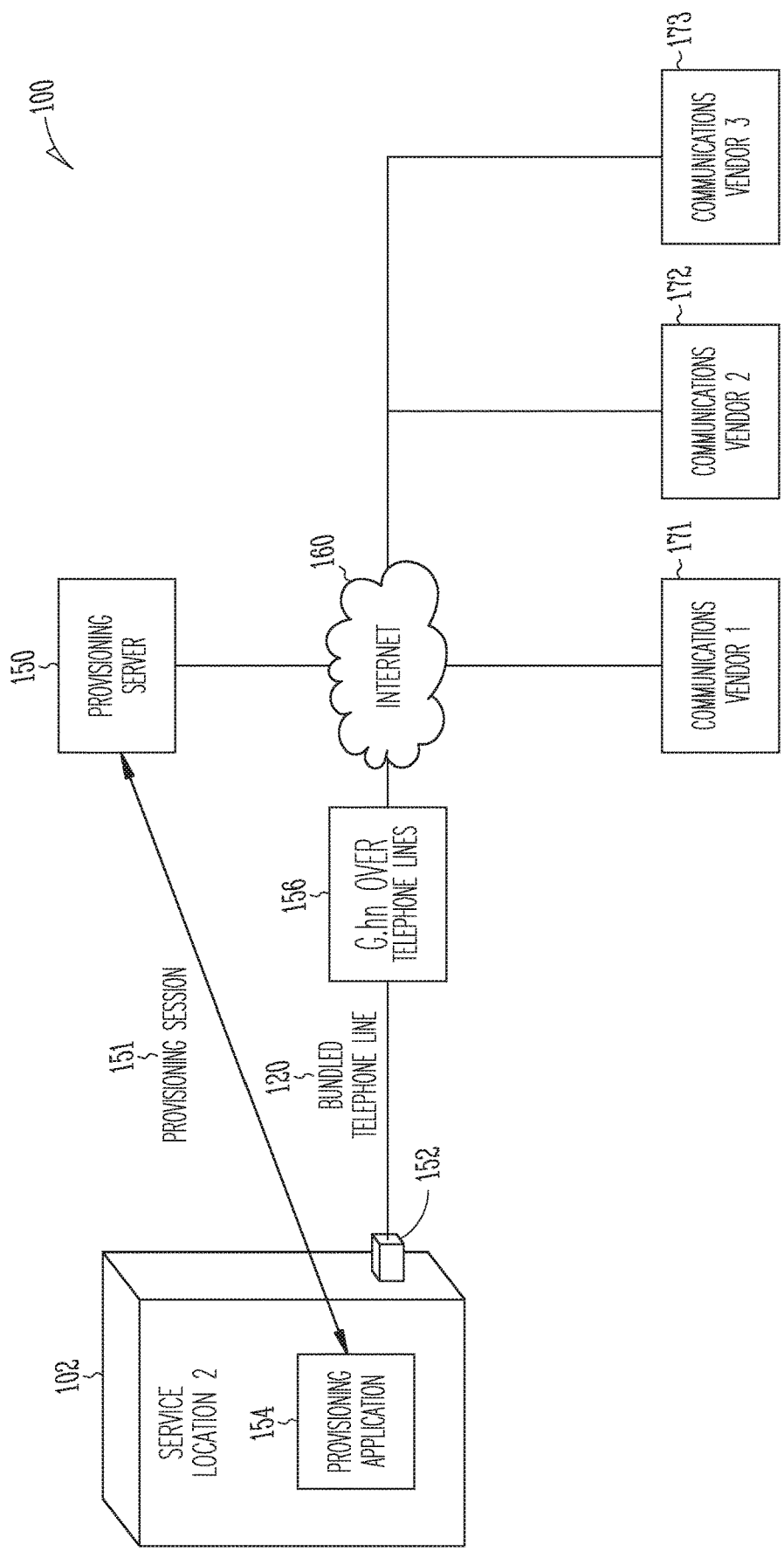
FIG. 3 demonstrates an example of a digital communication port configured to communicate over a twisted pair telephone connection according to one embodiment of the present subject matter.

FIG. 3 demonstrates an example of a digital communication port 152 configured to communicate over a twisted pair telephone connection according to one embodiment of the present subject matter. Service location 102 has a bundled telephone line 120 for digital communications to provide access to the internet 160. A user at service location 102 may connect the digital communications port 152 (in this embodiment a G.hn port) to the bundled telephone line 120 to provide for a G.hn over telephone line 156 connection to the internet 160, in various embodiments. When connecting the digital communications port 152, the user may access a provisioning application 154 (such as the application depicted in FIGS. 13-22) from a user's computer or personal device to interface with a provisioning server 150 to establish a provisioning session 151. During the provisioning session 151, the provisioning server 150 provisions the digital communications port 152 to provide an internet for the user. In various embodiments, the user may select a communications vendor from the available communications vendors 171, 172, 173 during the provisioning session 151 using the provisioning application 154. As will be discussed below, the user may also make further selections using the provisioning application 154, such as service type, service plan, service cost, etc.

Figure 4:
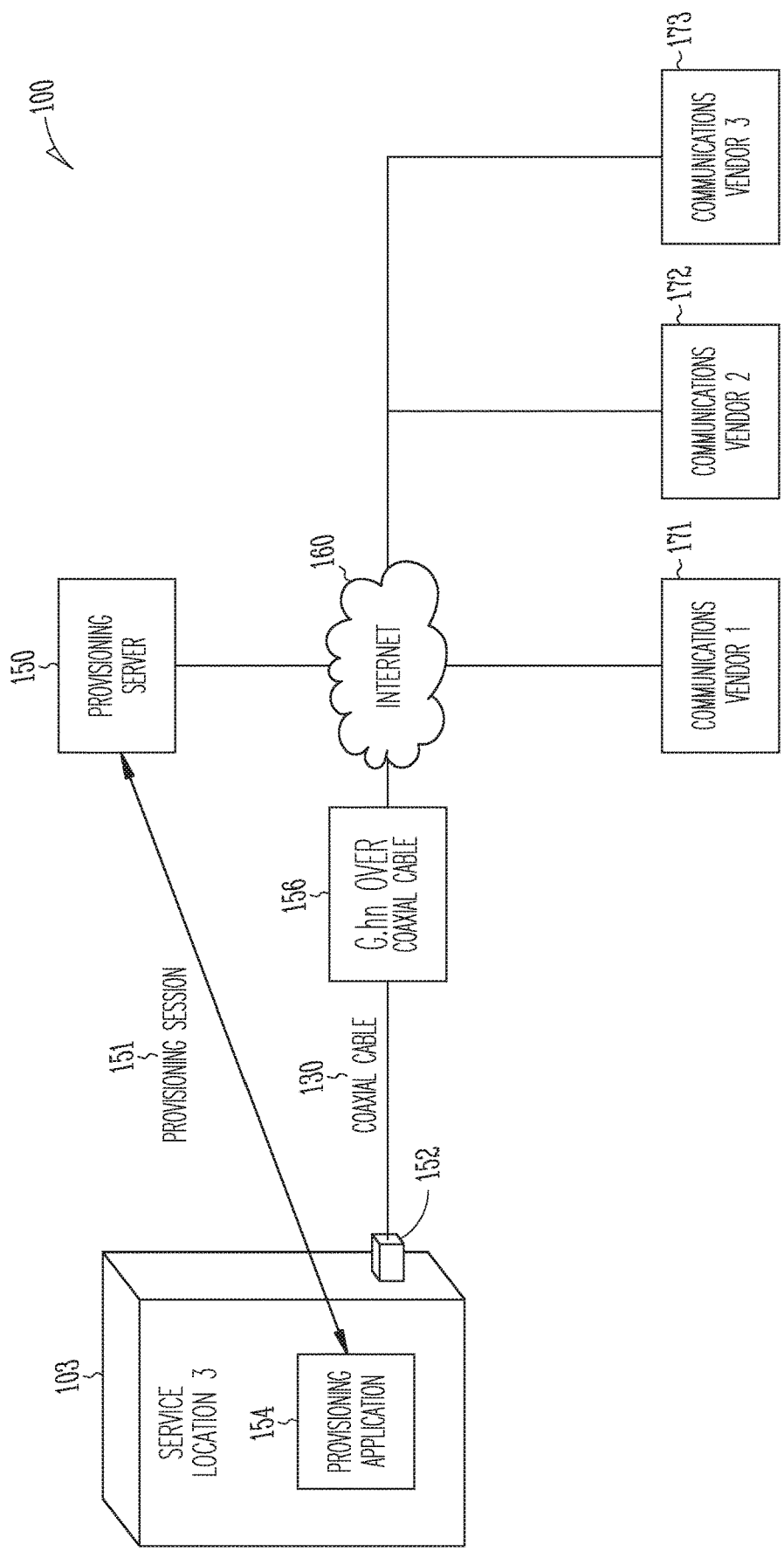
FIG. 4 demonstrates an example of a digital communication port configured to communicate over a coaxial cable network according to one embodiment of the present subject matter.

FIG. 4 demonstrates an example of a digital communication port 152 configured to communicate over a coaxial cable network according to one embodiment of the present subject matter. Service location 103 has a coaxial cable 130 for digital communications to provide access to the internet 160. A user at service location 103 may connect the digital communications port 152 (in this embodiment a G.hn port) to the coaxial cable 130 to provide for a G.hn over coaxial cable 156 connection to the internet 160, in various embodiments. When connecting the digital communications port 152, the user may access a provisioning application 154 (such as the application depicted in FIGS. 13-22) from a user's computer or personal device to interface with a provisioning server 150 to establish a provisioning session 151. During the provisioning session 151, the provisioning server 150 provisions the digital communications port 152 to provide an internet connection for the user. In various embodiments, the user may select a communications vendor from the available communications vendors 171, 172, 173 during the provisioning session 151 using the provisioning application 154. As will be discussed below, the user may also make further selections using the provisioning application 154, such as service type, service plan, service cost, etc.

Figure 5:
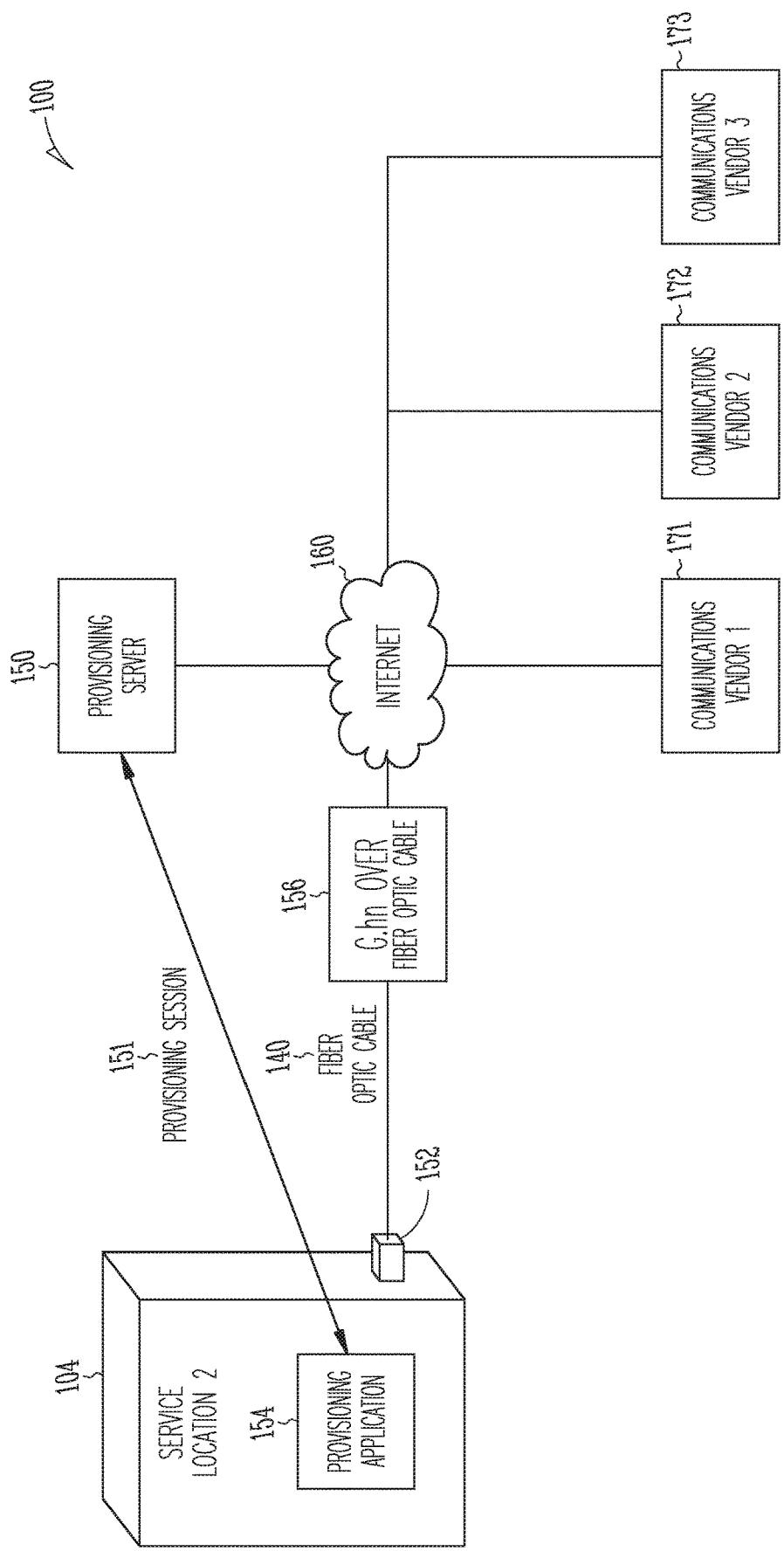
FIG. 5 demonstrates an example of a digital communication port configured to communicate over a network including a fiber optic cable portion according to one embodiment of the present subject matter.

FIG. 5 demonstrates an example of a digital communication port 152 configured to communicate over a network including a fiber optic cable portion according to one embodiment of the present subject matter. Service location 104 has a fiber optic cable 140 for digital communications to provide access to the internet 160. A user at service location 104 may connect the digital communications port 152 (in this embodiment a G.hn port) to the fiber optic cable 140 to provide for a G.hn over coaxial cable 156 connection to the internet 160, in various embodiments. When connecting the digital communications port 152, the user may access a provisioning application 154 (such as the application depicted in FIGS. 13-22) from a user's computer or personal device to interface with a provisioning server 150 to establish a provisioning session 151. During the provisioning session 151, the provisioning server 150 provisions the digital communications port 152 to provide an internet connection for the user. In various embodiments, the user may select a communications vendor from the available communications vendors 171, 172, 173 during the provisioning session 151 using the provisioning application 154. As will be discussed below, the user may also make further selections using the provisioning application 154, such as service type, service plan, service cost, etc.

Figure 6:
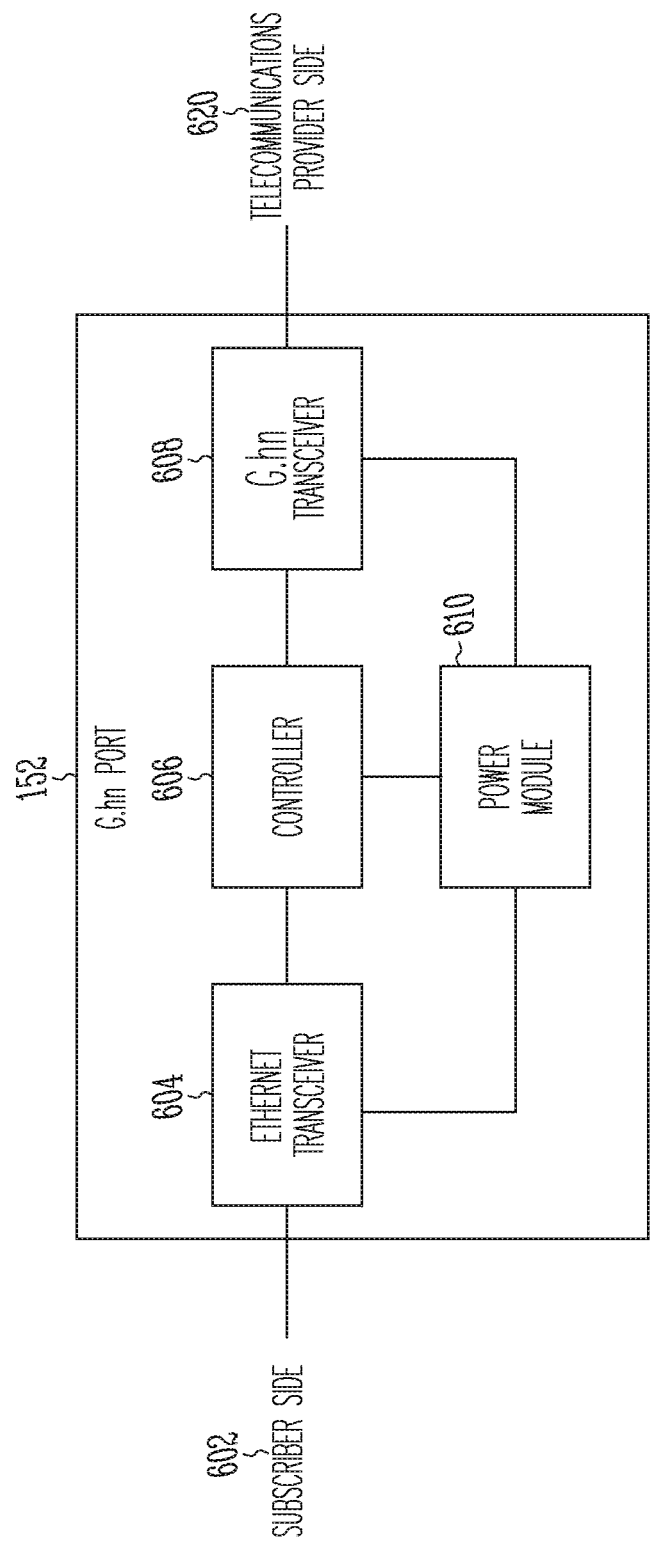
FIG. 6 is a block diagram showing an example of a digital communication port employing the G.hn protocol according to one embodiment of the present subject matter.

FIG. 6 is a block diagram showing an example of a digital communication port 152 employing the G.hn protocol according to one embodiment of the present subject matter. The digital communication port 152 includes an ethernet transceiver 604 configured to interface with a subscriber side 602 and a G.hn transceiver 608 configured to interface with a telecommunications provider side 620, in various embodiments. In the depicted embodiment, the digital communication port 152 includes a processor or controller 606 programmed to control operation of the ethernet transceiver 604 and the G.hn transceiver 608, and further includes a power module 610 to provide electrical power to the ethernet transceiver 604, the G.hn transceiver 608, and the controller 606.

Figure 7:
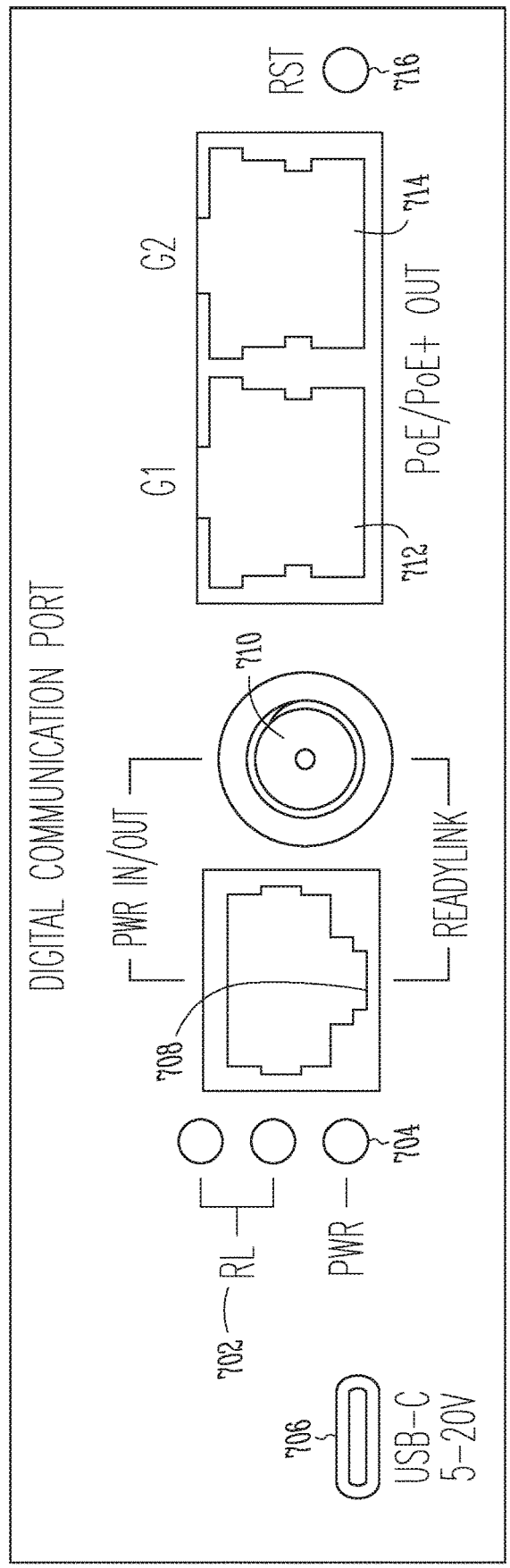
FIG. 7 is an exemplary digital communication port showing various connection options according to one embodiment of the present subject matter.

FIG. 7 is an exemplary digital communication port 152 showing various connection options according to one embodiment of the present subject matter. The digital communications port 152 includes a number of input connections, output connections, buttons, and/or indicator lights. In various embodiments, the digital communications port 152 may include a different number of input connections, output connections, buttons, and/or indicator lights, without departing from the scope of the present subject matter. In the depicted embodiment, the digital communication port 152 includes communication status indicator lights 702, a power status indicator light 704, a universal service bus (USB-C) input 706, a twisted-pair telephone connector input/output 708, a coaxial cable connector input/output 710, a pair of ethernet cable connector input/outputs 712, 714, and a reset button 716. According to various embodiments, one or more of the USB-C input 706, the twisted-pair telephone connector input/output 708, the coaxial cable connector input/output 710, or the pair of ethernet cable connector input/outputs 712, 714 may be used to provide power to and/or from the digital communications port 152. For example, in one embodiment the pair of ethernet cable connector input/outputs 712, 714 may be used as power-over-ethernet (PoE) connectors to receive power or to provide power to or from other devices, such as other digital communication ports 152.

Figure 8:
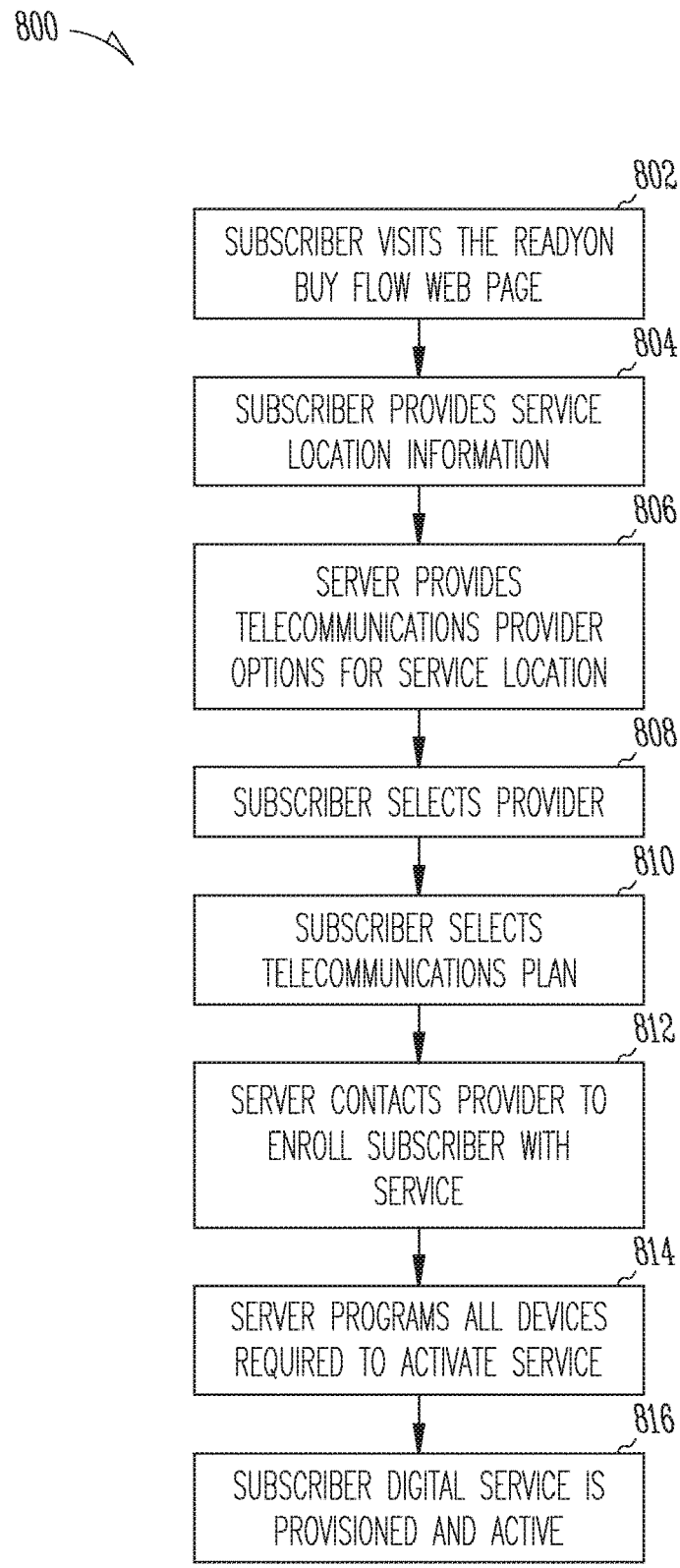
FIG. 8 is a flow diagram showing an example of a subscription process, according to one embodiment of the present subject matter.

FIG. 8 is a flow diagram showing an example of a subscription process or method 800, according to one embodiment of the present subject matter. In various embodiments the method 800 begins with a subscriber or user visiting a provisioning server using the provisioning application or web page, at step 802. At step 804, the subscriber provides service location information via the provisioning application. The provisioning server provides telecommunications provider options for the service location via the provisioning application, at step 806. At steps 808 and 810, the subscriber selects a telecommunications provider and a telecommunications plan from the options identified by the provisioning server. The provisioning server contacts the selected provider to enroll the subscriber in the selected telecommunications plan, at step 812. At step 814, the server programs all devices (including, for example, a G.hn digital communications port) with parameters to activate service at the service location. Subscriber digital service is provisioned and activated, at step 816.

Figure 9:
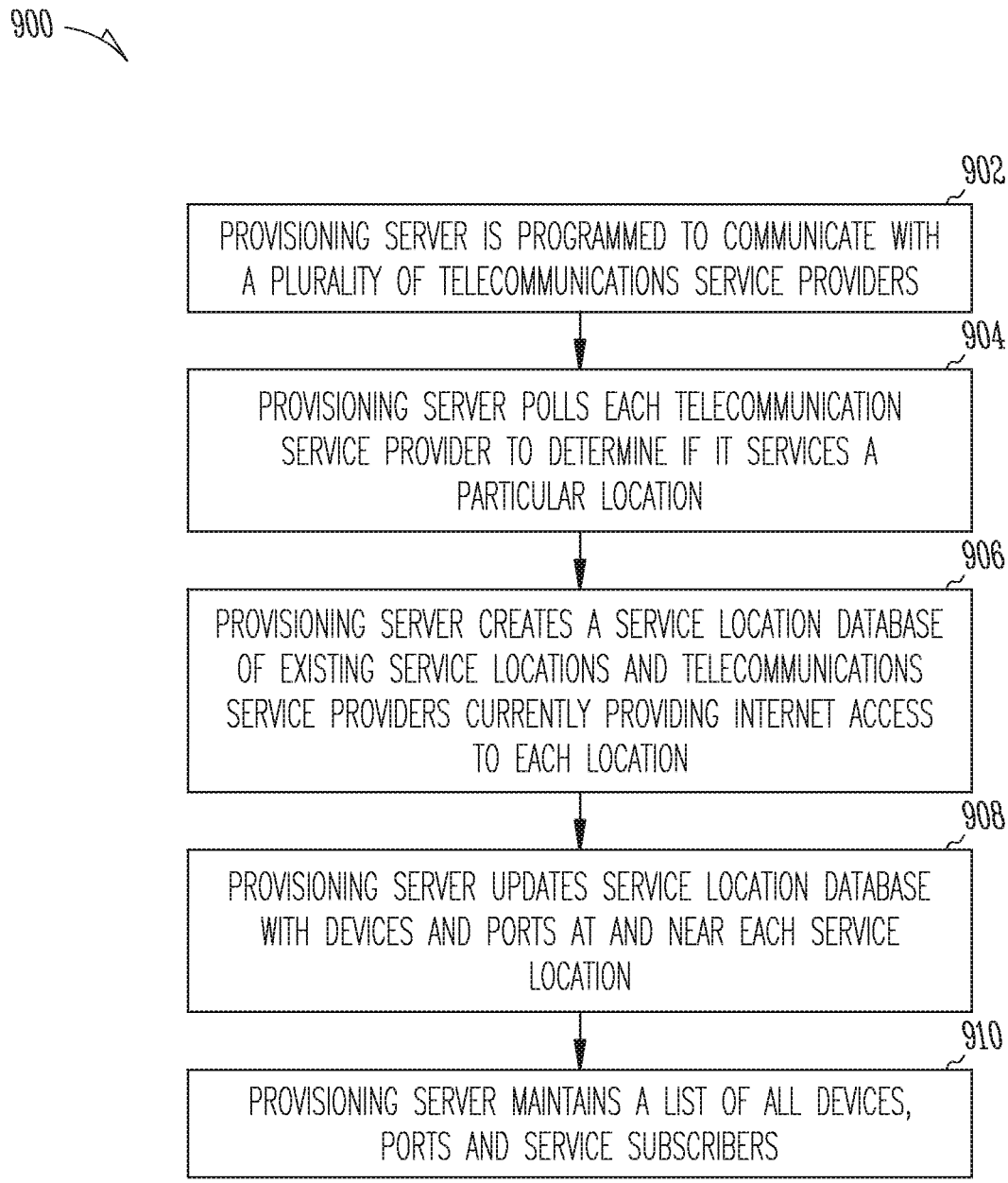
FIG. 9 is a flow diagram demonstrating how the communications server provides connection options to a subscriber from various telecommunication services, according to one embodiment of the present subject matter.

FIG. 9 is a flow diagram demonstrating how the communications server provides connection options to a subscriber from various telecommunication services, according to one embodiment of the present subject matter. According to various embodiment, a method 900 includes programming a provisioning server to communicate with a plurality of telecommunications service providers, at step 902. At step 904, the provisioning server polls each telecommunication service provider to determine if it services a particular location (e.g., the location provided by the subscriber via the provisioning application interface). The provisioning server creates a service location database of existing service locations and telecommunications service providers currently providing internet access to each location, at step 906. At step 908, the provisioning server updates the service location database with devices and ports at and near each service location. The provisioning server maintains a list of all devices, ports and service subscribers, at step 910.

Figure 10:
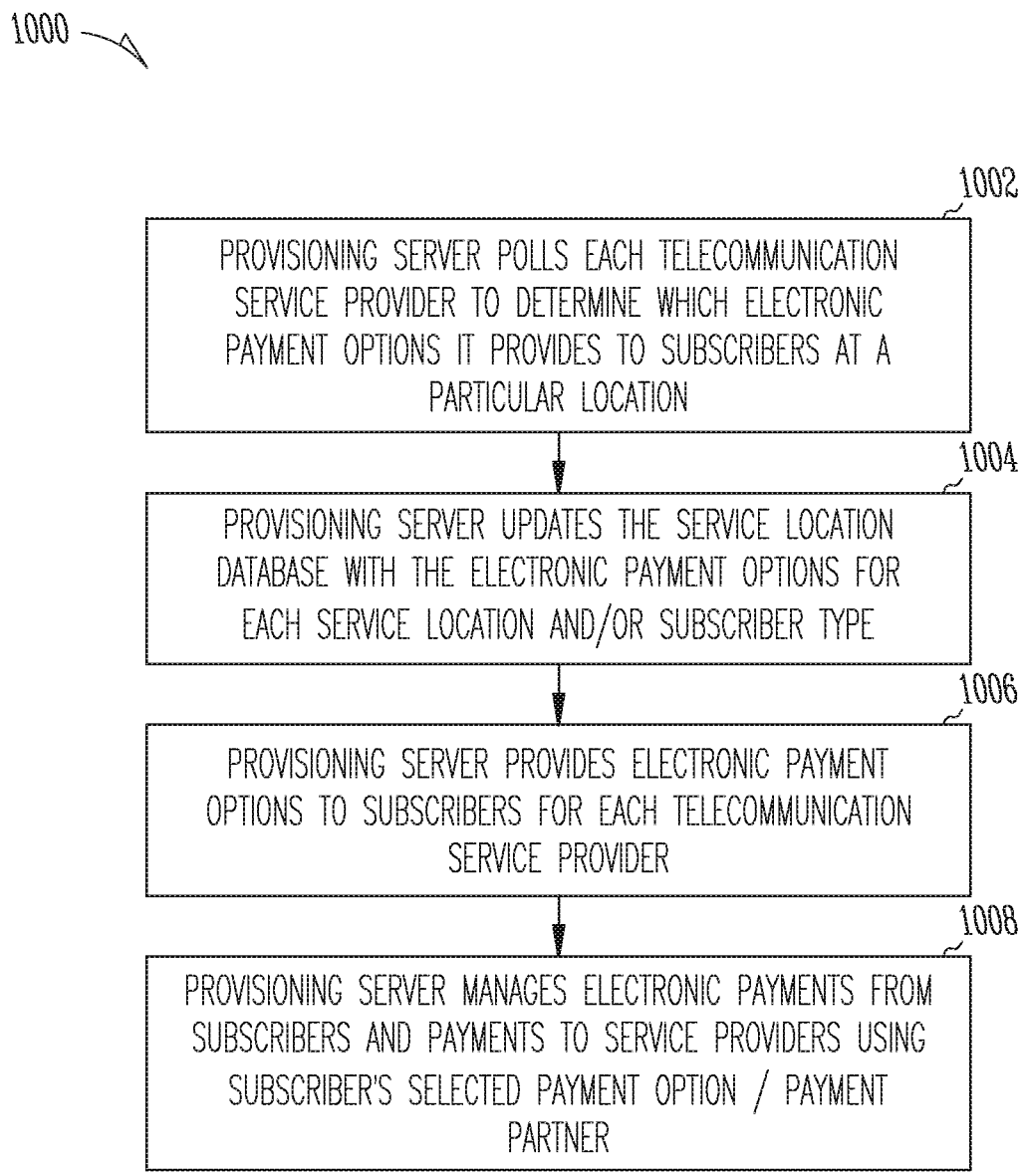
FIG. 10 is a flow diagram showing one example of how electronic payments are made, according to one embodiment of the present subject matter.

FIG. 10 is a flow diagram showing one example of a method 1000 for making electronic payments, according to one embodiment of the present subject matter. At step 1002, a provisioning server polls each telecommunication service provider to determine which electronic payment options it provides to subscribers at a particular location. The provisioning server updates the service location database with the electronic payment options for each service location and/or subscriber type, at step 1004. At step 1006, the provisioning server provides electronic payment options to subscribers for each telecommunication service provider. The provisioning server manages electronic payments from subscribers and payments to service providers using the subscriber's selected payment option and/or payment partner, at step 1008.

Figure 11:
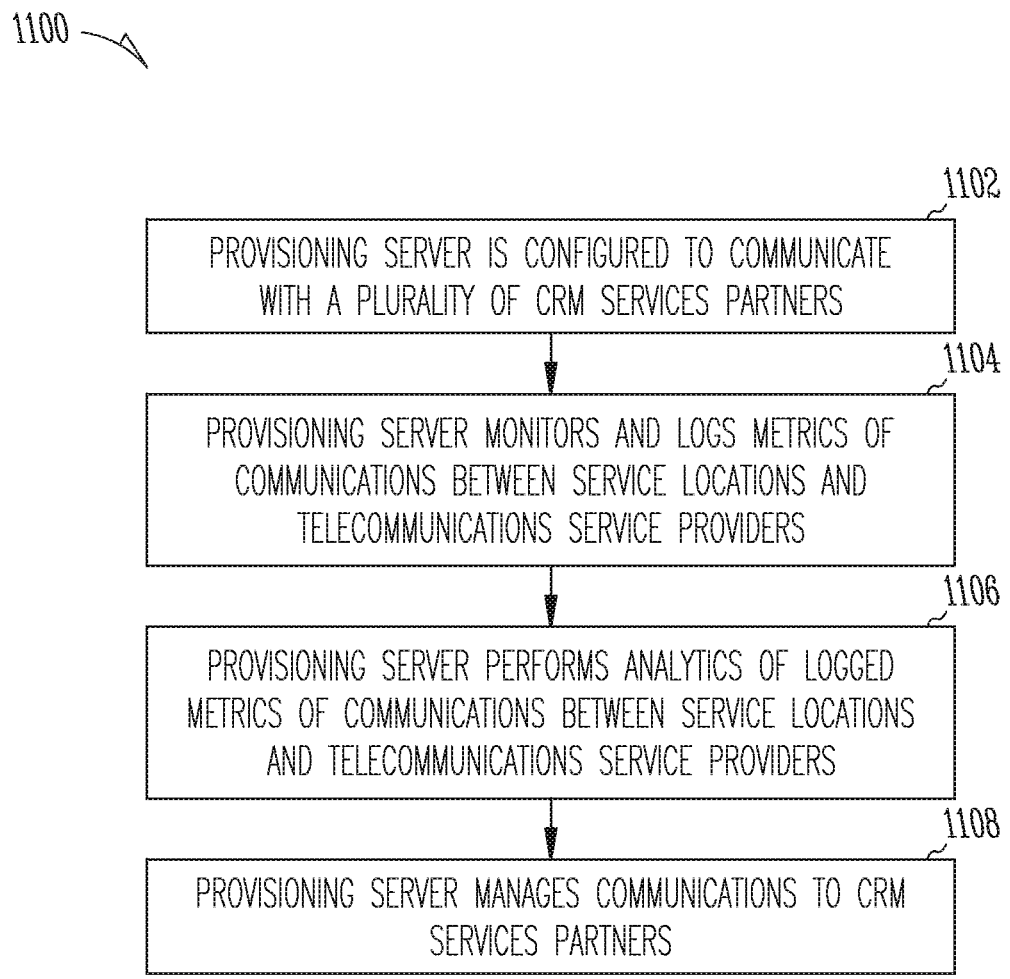
FIG. 11 is a flow diagram showing one example of collection of data metrics and logging communication data, according to one embodiment of the present subject matter.

FIG. 11 is a flow diagram showing one example of collection of data metrics and logging communication data, according to one embodiment of the present subject matter. In various embodiments, a method 1100 includes configuring a provisioning server to communicate with a plurality of customer relationship management (CRM) services partners, at step 1102. At step 1104, the provisioning server monitors and logs metrics of communications between service locations and telecommunications service providers. The provisioning server performs analytics of logged metrics of communications between service locations and telecommunications service providers, at step 1106. At step 1108, the provisioning server manages communications to CRM services partners.

Figure 12:
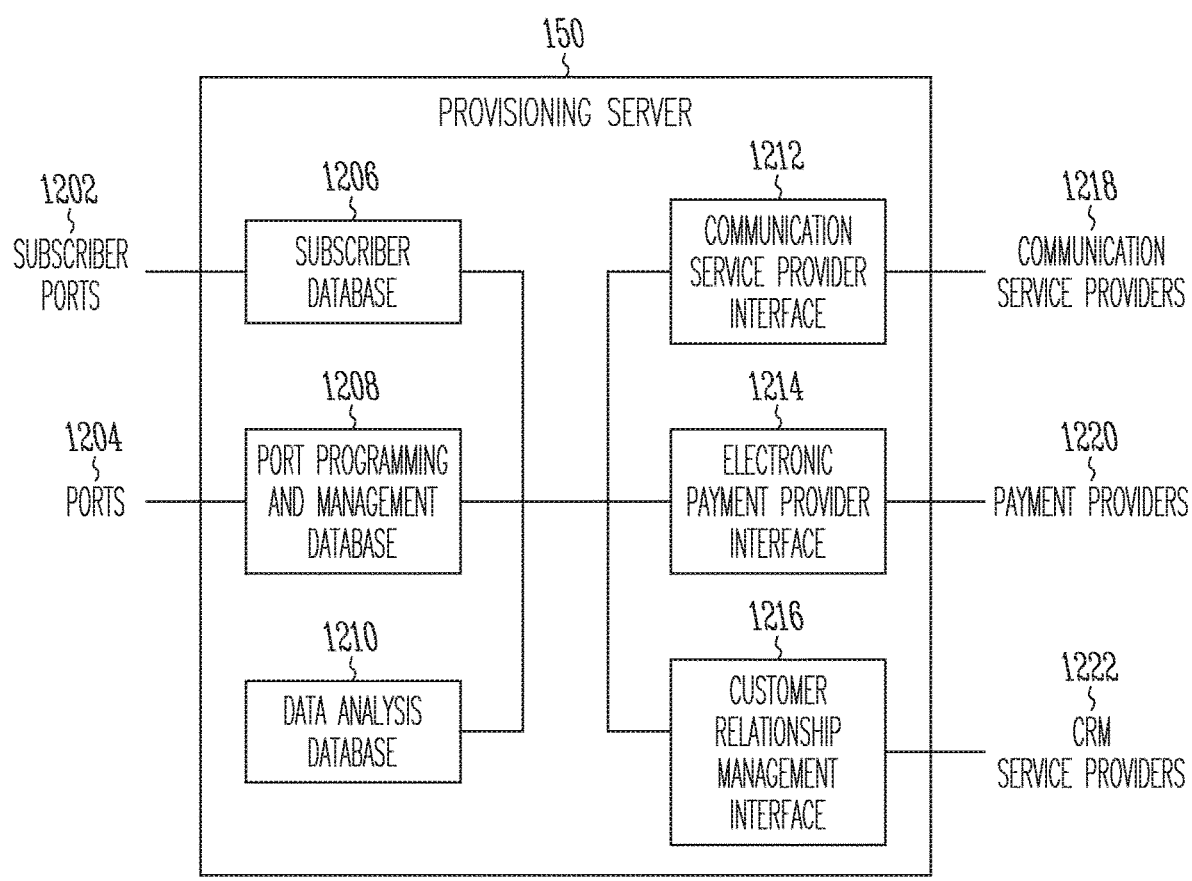
FIG. 12 is a block diagram demonstrating an example of different functions in the provisioning server according to one embodiment of the present subject matter.

FIG. 12 is a block diagram demonstrating an example of different functions in the provisioning server 150 according to one embodiment of the present subject matter. In various embodiments, the provisioning server 150 includes a subscriber portal 1202 configured to provide access to a subscriber database 1206. The provisioning server 150 also includes one or more ports 1204 configured to provide access to a port programming and management database 1208, in various embodiments. According to various embodiments, the provisioning server 150 further includes a data analysis database 1210 and a communication service provider interface 1212 configured for access by communication service providers 1218. The provisioning server 150 also includes an electronic payment provider interface 1214 configured for access by payment providers 1220, and a CRM interface 1216 configured for access by CRM service providers 1222, in various embodiments.

Figure 13:
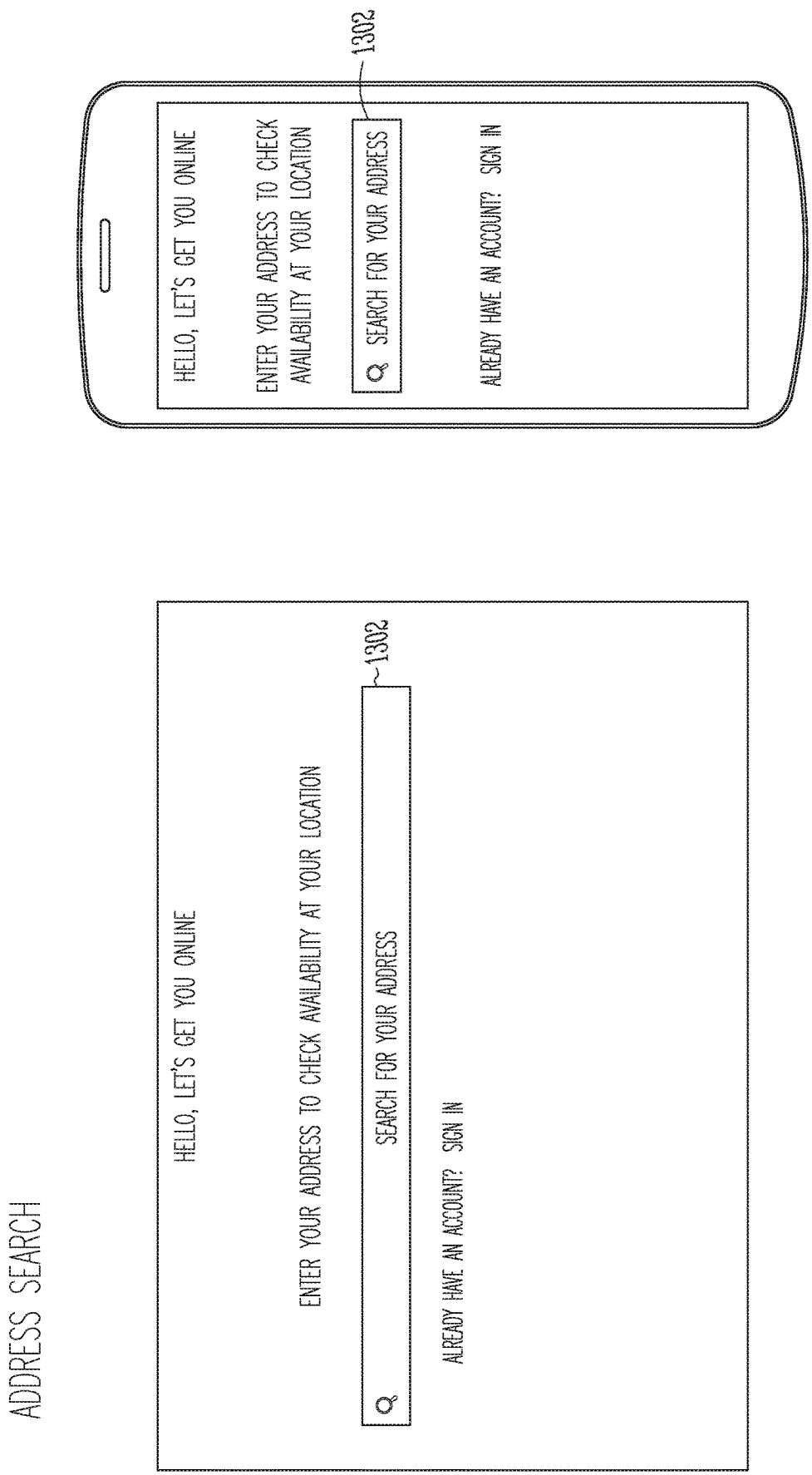
Figure 14:
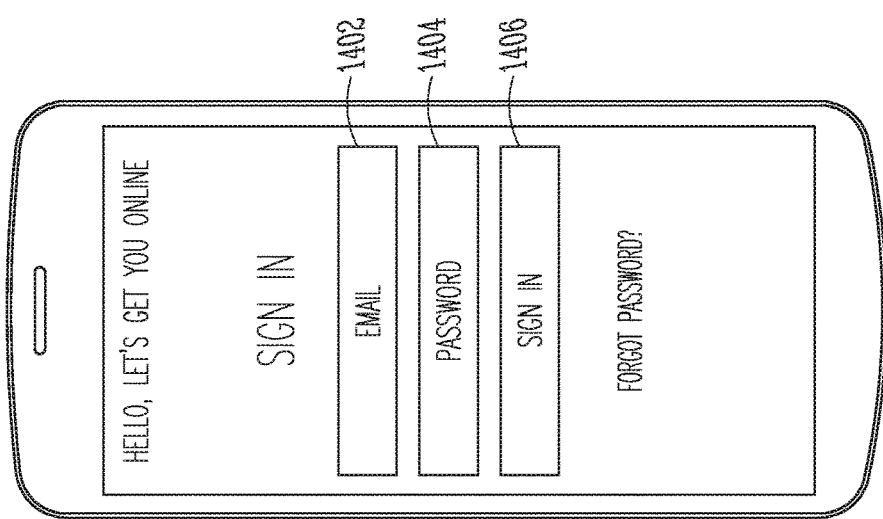
Figure 15:
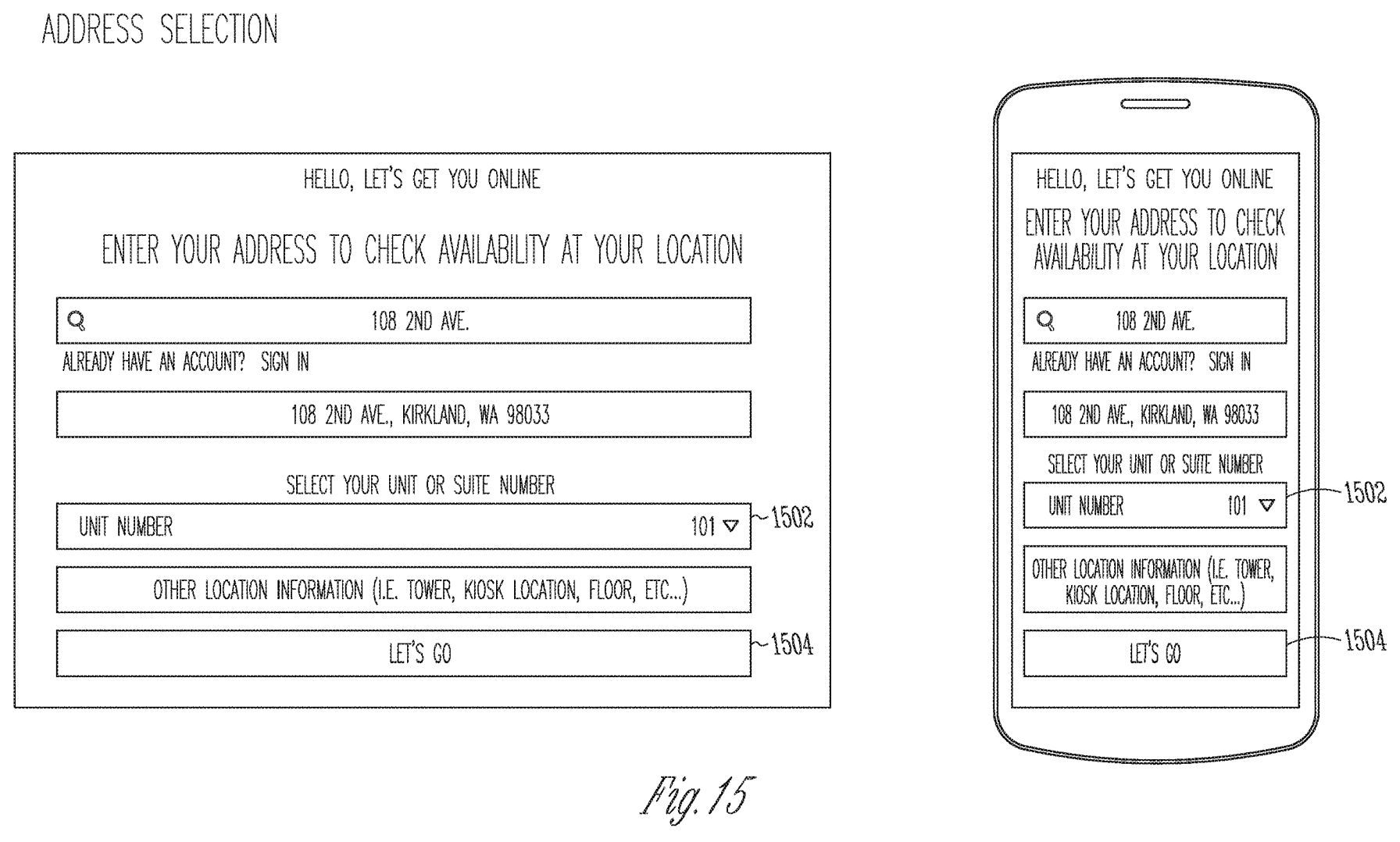

FIGS. 13-22 show examples of various onboarding screens available to a subscriber for establishing digital communications using the digital communications port of the present subject matter according to one embodiment of the present subject matter. In each of FIGS. 13-22, an example screen shot is provided for both a computer display screen (left-hand side) and a corresponding mobile device display screen (right-hand side) as viewed by a subscriber when accessing the provisioning application of the present subject matter. FIG. 13 illustrates address search screens for a user or subscriber to provide an address 1302 for a service location. Upon entering the address, the provisioning application determines availability of service at the provided address, in various embodiments, FIG. 14 illustrates account login screens for a user to provide an email 1402 and password 1404. The account login screens further provide a sign in button 1406 to enable the user or subscriber to click on to login to the provisioning application after entering the correct email and password. FIG. 15 illustrates address selection screens for a user or subscriber to select an apartment, suite or unit number 1502 for a service location after entering the address as shown in FIG. 13. A clickable button 1504 is provided on the display to advance to the next screen upon selection of the apartment, suite or unit number. FIG. 16 illustrates service provider and speed selection screens of the provisioning application, in various embodiments. The subscriber can select from available service providers using drop down menu 1602, in an embodiment. After selecting a service provider, the subscriber can select a from among plans provided by the selected service provider, based on access speed and cost, by clicking on a selectable portion of the display 1604, in various embodiments.

Figure 18:
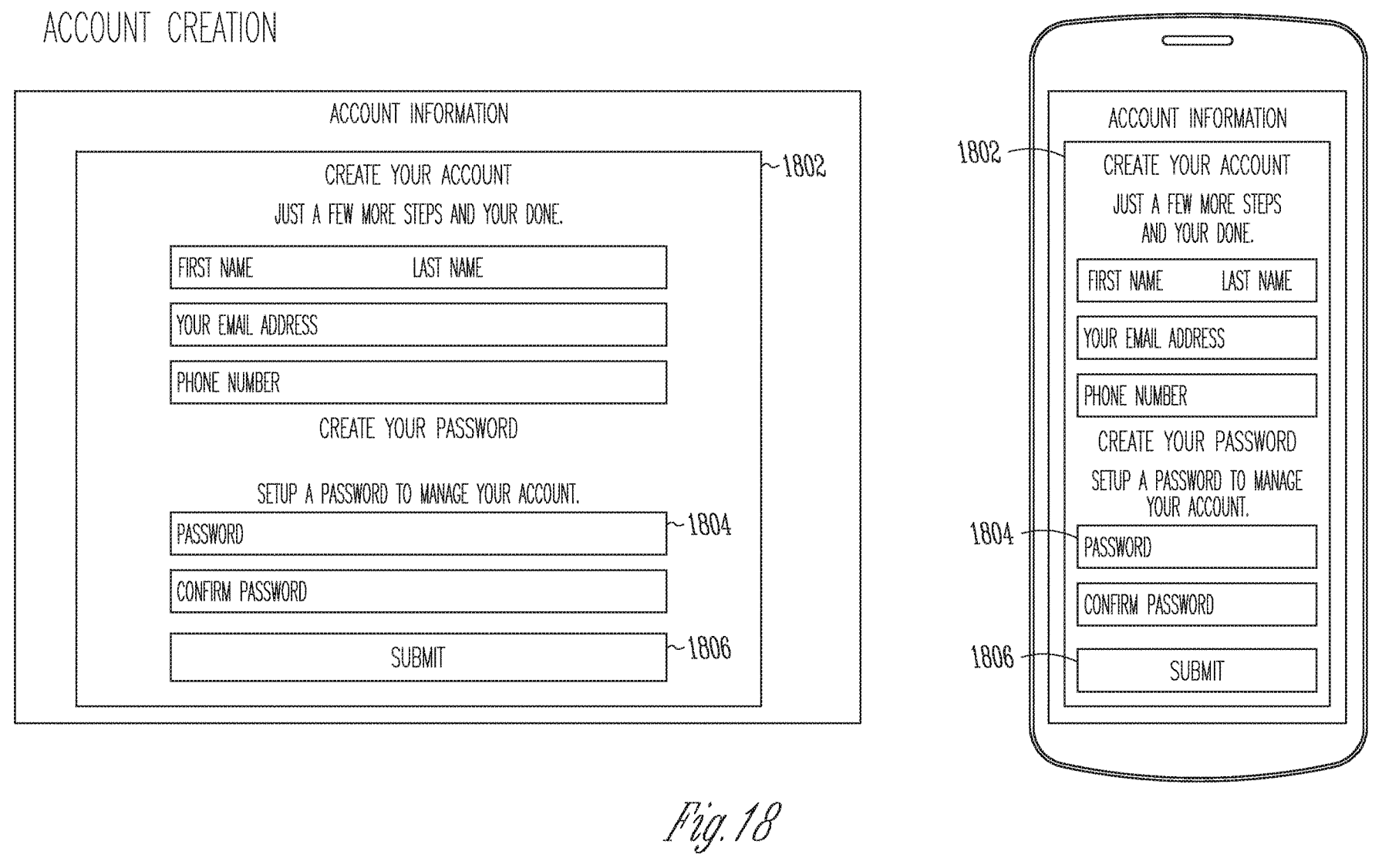

FIG. 17 illustrates installation information screens of the provisioning application, in various embodiments. The subscriber is provided with information 1702 regarding installation of the equipment, such as a digital communications port, in an embodiment. A clickable button 1704 is provided on the display to advance to the next screen upon completion of review of the installation information, in an embodiment. FIG. 18 illustrates account creation screens of the provisioning application, in various embodiments. The account creation screens allow a user or subscriber to create an account 1802 by entering a name, email address and phone number, in an embodiment. The account creation screens also allow a user or subscriber to create and confirm a password 1804. The account creation screens further provide a submit button 1806 to enable the user or subscriber to click on to submit the information to the provisioning application after entering the requested information.

Figure 20:
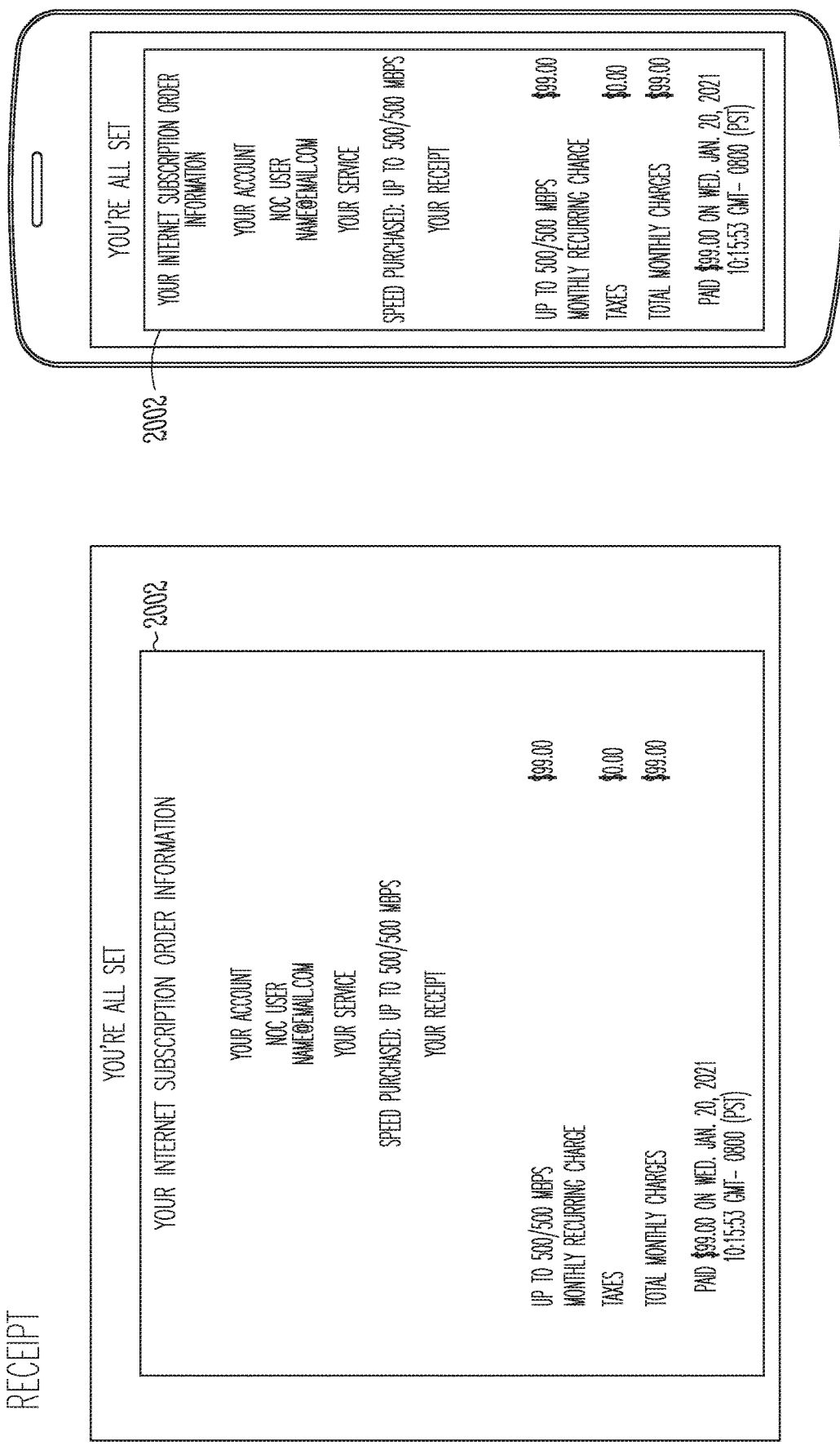

FIG. 19 illustrates order information screens of the provisioning application, in various embodiments. The order information screens provide a transaction summary portion 1902 informing the subscriber of the costs and charges associated with the selected service provider and plan, in an embodiment. The order information screens further provide a payment information portion 1904 that can be used by the subscriber to enter or confirm payment method information, such as account numbers in various embodiments. In some embodiments, the order information screen includes a selectable portion 1906 to provide for purchase completion by the subscriber after reviewing the transaction summary and payment information. FIG. 20 illustrates receipt screens of the provisioning application, in various embodiments. The receipt screens provide a summary 2002 of the subscriber's internet subscription order information, including service and payment information in the depicted embodiment.

Figure 21:
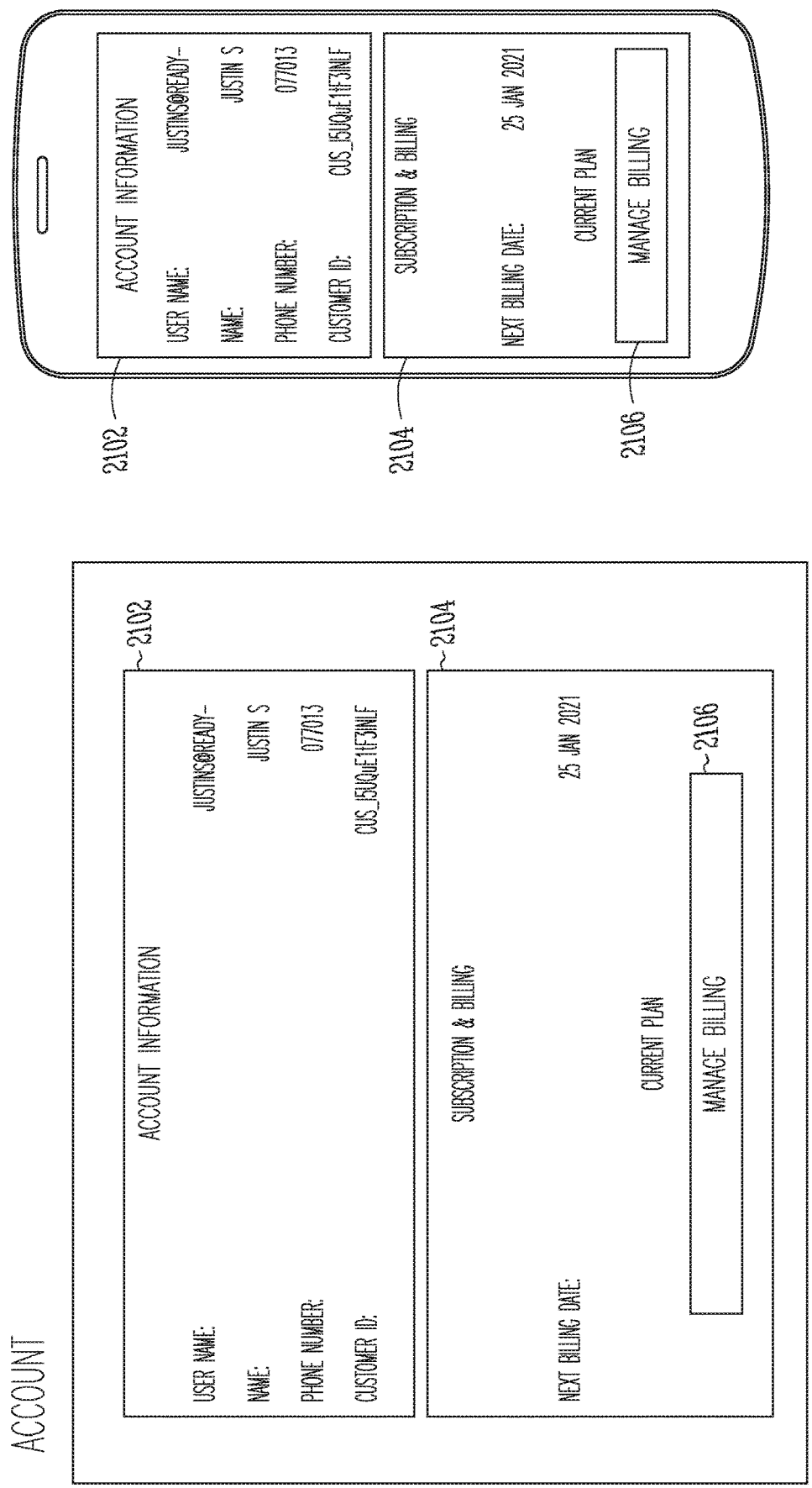
Figure 22:
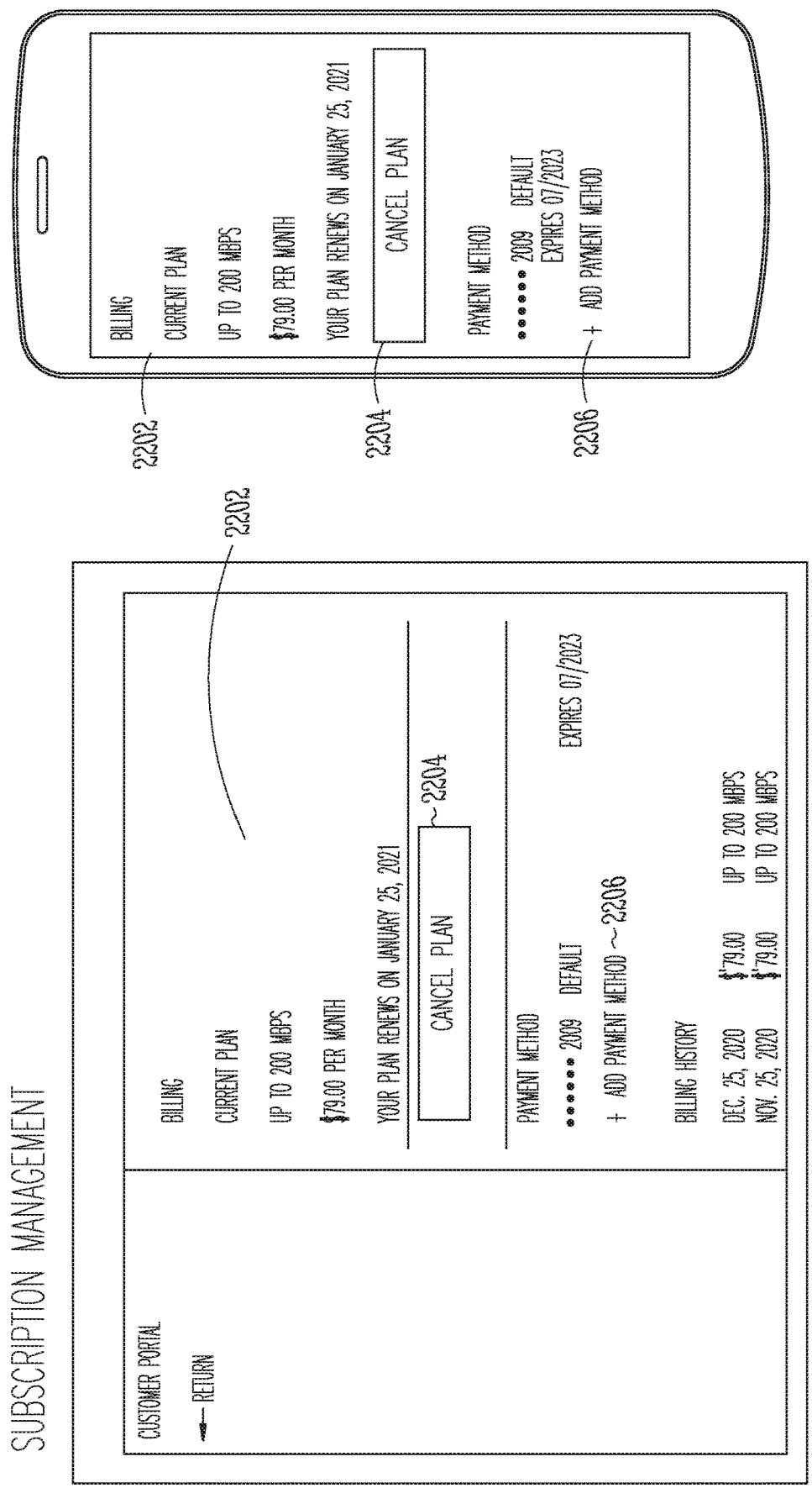

FIG. 21 illustrates account information screens of the provisioning application, in various embodiments. The account information screens provide an account information portion 2102 informing the subscriber of their username and customer identification number, along with other account details, in an embodiment. The account information screens further provide a subscription and billing portion 2104 that informs the subscriber future billing dates, in various embodiments. In some embodiments, the account information screens include a selectable portion 2106 to provide for modification of billing information by the subscriber. FIG. 22 illustrates subscription management screens of the provisioning application, in various embodiments. The subscription management screens provide a billing information portion 2202 informing the subscriber of their current subscription plan, payment method and billing history, in an embodiment. The subscription management screens further provide a selectable portion 2204 that allows the subscriber to cancel their plan, in various embodiments. In some embodiments, the account information screens include a second selectable portion 2206 to provide for adding a payment method by the subscriber.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may, be regarded as being communicatively coupled. Where multiple hardware modules exist contemporaneously; communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-22 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 23:
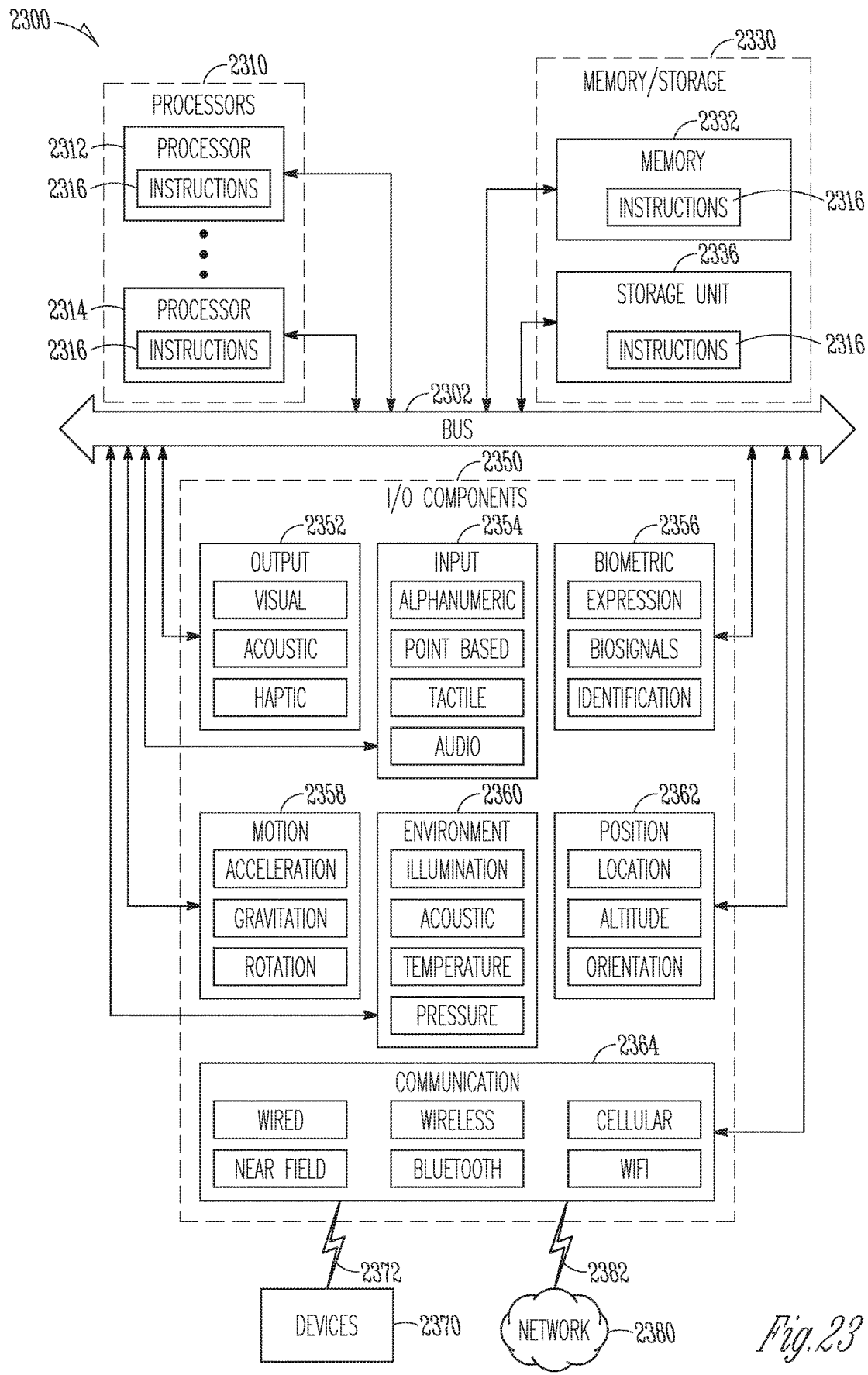
FIG. 23 is a block diagram illustrating components of a machine, according to some example embodiments, able to read instructions from a machine-readable medium (e.g., a machine-readable storage medium) and perform any one or more of the methodologies discussed herein.

FIG. 23 is a block diagram illustrating components of a machine 2300, according to some example embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an apples, an app, or other executable code) for causing the machine 2300 to perform any one or more of the methodologies discussed herein may be executed. For example the instructions may cause the machine to execute the flow diagrams of FIGS. 8-11. Additionally, or alternatively, the instructions may implement one or more of the devices and/or components of FIGS. 1-7 and 12. The instructions transform the general, non-programmed machine into a particular machine programmed to carry out the described and illustrated functions in the manner described. In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a personal digital assistant (PDA), or any machine capable of executing the instructions 2316, sequentially or otherwise, that specify actions to be taken by machine 2300. Further, while only a single machine 2300 is illustrated, the term "machine" shall also be taken to include a collection of machines 2300 that individually or jointly execute the instructions 2316 to perform any one or more of the methodologies discussed herein.

The machine 2300 may include processors 2310, memory 2330, and I/O components 2350, which may be configured to communicate with each other such as via a bus 2302. In an example embodiment, the processors 2310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RTIC), another processor, or any suitable combination thereof) may include, for example, processor 2312 and processor 2314 that may execute instructions 2316. The term "processor" is intended to include multi-core processor that may comprise two or more independent processors (sometimes referred to as "cores") that may execute instructions contemporaneously. Although FIG. 23 shows multiple processors, the machine 2300 may include a single processor with a single core, a single processor with multiple cores (e.g., a multi-core process), multiple processors with a single core, multiple processors with multiples cores, or any combination thereof.

The memory/storage 2330 may include a memory 2332, such as a main memory, or other memory storage, and a storage unit 2336, both accessible to the processors 2310 such as via the bus 2302. The storage unit 2336 and memory 2332 store the instructions 2316 embodying any one or more of the methodologies or functions described herein. The instructions 2316 may also reside, completely or partially, within the memory 2332, within the storage unit 2336, within at least one of the processors 2310 (e.g., within the processor's cache memory), or any suitable combination thereof, during execution thereof by the machine 2300. Accordingly, the memory 2332, the storage unit 2336, and the memory of processors 2310 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2316. The term "machine-readable medium" shall also be taken to include any medium, or combination of multiple media, that is capable of storing instructions (e.g., instructions 2316) for execution by a machine (e.g., machine 2300), such that the instructions, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2350 may include a wide variety of components to receive input, provide output, produce output, transmit information, exchange information, capture measurements, and so on. The specific I/O components 2350 that are included in a particular machine will depend on the type of machine. For example, portable machines such as mobile phones will likely include a touch input device or other such input mechanisms, while a headless server machine will likely not include such a touch input device. It will be appreciated that the I/O components 2350 may include many other components that are not shown in FIG. 23. The I/O components 2350 are grouped according to functionality merely for simplifying the following discussion and the grouping is in no way limiting. In various example embodiments, the I/O components 2350 may include output components 2352 and input components 2354, The output components 2352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2350 may include biometric components 2356, motion components 2358, environmental components 2360, or position components 2362 among a wide array of other components. For example, the biometric components 2356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 may include acceleration sensor components (e.g., accelerometer), gravitation sensor components, rotation sensor components (e.g., gyroscope), and so forth. The environmental components 2360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2350 may include communication components 2364 operable to couple the machine 2300 to a network 2380 or devices 2370 via coupling 2382 and coupling 2372 respectively. For example, the communication components 2364 may include a network interface component or other suitable device to interface with the network 2380. In further examples, communication components 2364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2370 may be another machine or any of a wide variety of peripheral devices (e.g., a peripheral device coupled via a Universal Serial Bus (USB)).

Moreover, the communication components 2364 may detect identifiers or include components operable to detect identifiers. For example, the communication components 2364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF413, Ultra Code, UCC RSS-2D bar code, and other optical codes), or acoustic detection components (e.g., microphones to identify tagged audio signals). In addition, a variety of information may be derived via the communication components 2364, such as, location via. Internet Protocol (IP) geo-location, location via Wi-Fi® signal triangulation, location via detecting a NFC beacon signal that may indicate a particular location, and so forth.

Transmission Medium

In various example embodiments, one or more portions of the network 2380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2380 or a portion of the network 2380 may include a wireless or cellular network and the coupling 2382 may be a Code Division Multiple Access (CDMA) connection, a Global System for Mobile communications (GSM) connection, or other type of cellular or wireless coupling. In this example, the coupling 2382 may implement any of a variety of types of data transfer technology, such as Single Carrier Radio Transmission Technology (1×RTT), Evolution-Data. Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2316 may be transmitted or received over the network 2380 using a transmission medium via a network interface device (e.g., a network interface component included in the communication components 2364) and utilizing any one of a number of well-known transfer protocols (e.g., hypertext transfer protocol (HTTP)). Similarly, the instructions 2316 may be transmitted or received using a transmission medium via the coupling 2372 (e.g., a peer-to-peer coupling) to devices 2370. The term "transmission medium" shall be taken to include any intangible medium that is capable of storing, encoding, or carrying instructions 2316 for execution by the machine 2300, and includes digital or analog communications signals or other intangible medium to facilitate communication of such software.

EXAMPLES

Example 1 is a method for provisioning customer broadband transport service at a point of service having a digital communication port, comprising: receiving a request from a user to establish the customer broadband transport service, the request including location information for the point of service; determining telecommunications provider options for the point of service based on the location information; providing the determined telecommunication provider options and respective available telecommunications plans to the user; receiving a user selection of one of the determined telecommunications provider options and one of the respective available telecommunication plans; and establishing digital communications between the digital communication port and the user-selected service provider.

In Example 2, the subject matter of Example 1 further includes, enrolling the user in the one of the respective available telecommunication plans.

In Example 3, the subject matter of Examples 1-2 further includes, configuring digital communications for the customer broadband transport service based on the user selection.

In Example 4, the subject matter of Examples 1-3 further includes, communicating with one or more telecommunications providers of a plurality of telecommunications providers.

In Example 5, the subject matter of Example 4 further includes, polling the one or more telecommunications providers to determine digital communications options.

In Example 6, the subject matter of Example 5 further includes, creating a service location database of existing service locations available for the existing service locations.

In Example 7, the subject matter of Example 6 includes, wherein creating the service location database includes storing telecommunications providers available for the existing service locations.

In Example 8, the subject matter of Example 6 further includes, updating the service location database with devices and ports at or near each service location.

In Example 9, the subject matter of Example 6 further includes, updating the service location database with subscribers at or near each service location.

In Example 10, the subject matter of Examples 1-9 includes, wherein establishing digital communications between the digital communication port and the user-selected service provider includes programming all devices used to activate service.

Example 11 is a system for provisioning customer broadband transport service at a point of service having a digital communication port, comprising: a processor; and memory including instructions that, when executed by the processor, cause the processor to: receive a request from a user to establish the customer broadband transport service, the request including location information for the point of service; determine telecommunications provider options for the point of service based on the location information; provide the determined telecommunication provider options and respective available telecommunications plans to the user; receive a user selection of one of the determined telecommunications provider options and one of the respective available telecommunication plans; and establish digital communications between the digital communication port and the user-selected service provider.

In Example 12, the subject matter of Example 11 includes, wherein the processor is programmed to enroll the user in the one of the respective available telecommunication plans.

In Example 13, the subject matter of Examples 11-12 includes, wherein the processor is programmed to configure digital communications for the customer broadband transport service based on the user selection.

In Example 14, the subject matter of Examples 11-13 includes, wherein the processor is programmed to communicate with one or more telecommunications providers of a plurality of telecommunications providers.

In Example 15, the subject matter of Example 14 includes, wherein the processor is programmed to poll the one or more telecommunications providers to determine the digital communications options.

In Example 16, the subject matter of Example 15 includes, wherein the processor is programmed to create a service location database of existing service locations available for the existing service locations.

In Example 17, the subject matter of Example 16 includes, wherein the processor is programmed to store telecommunications providers available for the existing service location in the service location database.

In Example 18, the subject matter of Example 16 includes, wherein the processor is programmed to update the service location database with devices and ports at or near each service location.

In Example 19, the subject matter of Example 16 includes, wherein the processor is programmed to update the service location database with subscribers at or near each service location.

In Example 20, the subject matter of Examples 11-19 includes, wherein to establish digital communications between the digital communication port and the user-selected service provider, the processor is programmed to program all devices used to activate service.

Example 21 is a non-transitory computer-readable storage medium, the computer-readable storage medium including instructions that when executed by computers, cause the computers to perform operations of: receive a request from a user to establish customer broadband transport service, the request including location information for a point of service; determine telecommunications provider options for the point of service based on the location information; provide the determined telecommunication provider options and respective available telecommunications plans to the user; receive a user selection of one of the determined telecommunications provider options and one of the respective available telecommunication plans; and establish digital communications between a digital communication port at the point of service and the user-selected service provider.

In Example 22, the subject matter of Example 21 includes, wherein the instructions further cause the computers to perform operations of: enroll the user in the one of the respective available telecommunication plans.

In Example 23, the subject matter of Examples 21-22 includes, wherein the instructions further cause the computer to perform operations of: program digital communications for the customer broadband transport service based on the user selection.

In Example 24, the subject matter of Examples 21-23 includes, wherein the instructions further cause the computer to perform operations of: communicate with one or more telecommunications providers of a plurality of telecommunications providers.

In Example 25, the subject matter of Example 24 includes, wherein the instructions further cause the computer to perform operations of: poll the one or more telecommunications providers to determine digital communications options.

In Example 26, the subject matter of Example 25 includes, wherein the instructions further cause the computer to perform operations of: create a service location database of existing service locations and telecommunications providers available for the existing service locations.

In Example 27, the subject matter of Example 26 includes, wherein the instructions further cause the computer to perform operations of: store telecommunications providers available for the existing service location in the service location database.

In Example 28, the subject matter of Example 26 includes, wherein the instructions further cause the computer to perform operations of: update the service location database with devices and ports at or near each service location.

In Example 29, the subject matter of Example 26 includes, wherein the instructions further cause the computer to perform operations of: update the service location database with subscribers at or near each service location.

In Example 30, the subject matter of Examples 21-29 includes, wherein to establish digital communications between the digital communication port and the user-selected service provider, the instructions further cause the computer perform operations of: program all devices used to activate service.

Example 31 is a mobile device for facilitating and provisioning customer broadband transport service at a point of service having a digital communication port, comprising: wireless communication electronics for communicating with at least one of a wi-fi connection point and a cellular service; and computer readable media containing instructions for at least: providing communications to a provisioning server to establish G.hn digital communications between the digital communication port and a service provider.

In Example 32, the subject matter of Example 31 includes, wherein the mobile device is a mobile phone.

In Example 33, the subject matter of Example 31 includes, wherein the mobile device is a portable computer.

Example 34 is at least one machine-readable medium including instructions that, when executed by processing circuitry; cause the processing circuitry to perform operations to implement of any of Examples 1-33.

Example 35 is an apparatus comprising means to implement of any of Examples 1-33.

Example 36 a system to implement of any of Examples 1-33.

Example 37 is a method to implement of any of Examples 1-33.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. The scope of the invention should be determined with reference to the appended claims, along with the full scope of equivalents to which such claims are entitled.

The invention claimed is:

1. A method for provisioning customer broadband transport service at a point of service having a digital communication port; comprising:
    receiving a digital communication indicating a request from a user to establish the customer broadband transport service, the digital communication including location information for the point of service;
    determining telecommunications provider options for the point of service using the location information;
    sending a digital message including the determined telecommunication provider options and respective available telecommunications plans that ma be processed by a device operable by the user;
    receiving a digital response including information relating to a user selection of one of the determined telecommunications provider options and one of the respective available telecommunication plans; and
    automatically provisioning broadband service from the user-selected service provider for digital communications with the digital communication port, wherein the user need not contact the user-selected service provider to establish the broadband transport service.

2. The method of claim 1, comprising enrolling the user in the one of the respective available telecommunication plans.

3. The method of claim 1, comprising configuring digital communications for the customer broadband transport service based on the user selection.

4. The method of claim 1, comprising digitally communicating with one or more telecommunications providers of a plurality of telecommunications providers.

5. The method of claim 4, further comprising digitally polling the one or more telecommunications providers to determine digital communications options.

6. The method of claim 5, further comprising creating a service location database of existing service locations available for the existing service locations.

7. The method of claim 6, wherein creating the service location database includes storing telecommunications providers available for the existing service locations.

8. The method of claim 6, further comprising updating the service location database with devices and ports at or near each service location.

9. The method of claim 6, further comprising updating the service location database with subscribers at or near each service location.

10. The method of claim 1, wherein establishing digital communications between the digital communication port and the user-selected service provider includes programming all devices used to activate service.

11. A system for provisioning customer broadband transport service at a point of service having a digital communication port, comprising:
    a processor; and
    memory including instructions that, when executed by the processor, cause the processor to:
    receive a digital communication indicating a request from a user to establish the customer broadband transport service, the digital communication including location information for the point of service;
    determine telecommunications provider options for the point of service using the location information;
    send a digital message including the determined telecommunication provider options and respective available telecommunications plans that may be processed by a device operable by the user;
    receive a digital response including information relating to a user selection of one of the determined telecommunications provider options and one of the respective available telecommunication plans; and
    automatically provision broadband service from the user-selected service provider for digital communications with the digital communication port, wherein the user need not contact the user-selected service provider to establish the broadband transport service.

12. The system of claim 11, wherein the processor is programmed to enroll the user in the one of the respective available telecommunication plans.

13. The system of claim 11, wherein the processor is programmed to configure digital communications for the customer broadband transport service based on the user selection.

14. The system of claim 11, wherein the processor is programmed to digitally communicate with one or more telecommunications providers of a plurality of telecommunications providers.

15. The system of claim 14, wherein the processor is programmed to digitally poll the one or more telecommunications providers to determine the digital communications options.

16. The system of claim 15, wherein the processor is programmed to create a service location database of existing service locations available for the existing service locations.

17. The system of claim 16, wherein the processor is programmed to store telecommunications providers available for the existing service location in the service location database.

18. The system of claim 16, wherein the processor is programmed to update the service location database with devices and ports at or near each service location.

19. The system of claim 16, wherein the processor is programmed to update the service location database with subscribers at or near each service location.

20. The system of claim 11, wherein to establish digital communications between the digital communication port and the user-selected service provider, the processor is programmed to program all devices used to activate service.

21. A non-transitory computer-readable storage medium, the computer-readable storage medium including instructions that when executed by computers, cause the computers to perform operations of:
  receive a digital communication indicating a request from a user to establish a customer broadband transport service, the digital communication including location information for a point of service;
  determine telecommunications provider options for the point of service using the location information;
  send a digital message including the determined telecommunication provider options and respective available telecommunications plans that ma be processed by a device operable by the user;
  receive a digital response including information relating to a user selection of one of the determined telecommunications provider options and one of the respective available telecommunication plans; and
  automatically provision broadband service from the user-selected service provider for establish digital communications with a digital communication port, wherein the user need not contact the user-selected service provider to establish the broadband transport service.

22. The non-transitory computer-readable storage medium of claim 21, wherein the instructions further cause the computers to perform operations of:
  enroll the user in the one of the respective available telecommunication plans.

23. The non-transitory computer-readable storage medium of claim 21, wherein the instructions further cause the computer to perform operations of:
  program digital communications for the customer broadband transport service based on the user selection.

24. The non-transitory computer-readable storage medium of claim wherein the instructions further cause the computer to perform operations of:
  digitally communicate with one or more telecommunications providers of a plurality of telecommunications providers.

25. The non-transitory computer-readable storage medium of claim 24, wherein the instructions further cause the computer to perform operations of:
  digitally poll the one or more telecommunications providers to determine digital communications options.

26. The non-transitory computer-readable storage medium of claim 25, wherein the instructions further cause the computer to perform operations of:
  create a service location database of existing service locations and telecommunications providers available for the existing service locations.

27. The non-transitory computer-readable storage medium of claim 26, wherein the instructions further cause the computer to perform operations of:
  store telecommunications providers available for the existing service location in the service location database.

28. The non-transitory computer-readable storage medium of claim 26, wherein the instructions further cause the computer to perform operations of:
  update the service location database with devices and ports at or near each service location.

29. The non-transitory computer-readable storage medium of claim 26, wherein the instructions further cause the computer to perform operations of:
  update the service location database with subscribers at or near each service location.

30. The non-transitory computer-readable storage medium of claim 21, wherein to establish digital communications between the digital communication port and the user-selected service provider, the instructions further cause the computer to perform operations of: program all devices used to activate service.

* * * * *

UNITED STATES PATENT AND TRADEMARK OFFICE
CERTIFICATE OF CORRECTION

PATENT NO. : 11,558,264 B1
APPLICATION NO. : 17/804161
DATED : January 17, 2023
INVENTOR(S) : Synstelien et al.

It is certified that error appears in the above-identified patent and that said Letters Patent is hereby corrected as shown below:

In the Specification

In Column 1, Line 13, after "to", insert --co-pending,--

In Column 7, Line 31, delete "embodiments," and insert --embodiments.-- therefor In Column 9, Line 32, delete "may," and insert --may-- therefor In Column 9, Line 34, delete "contemporaneously;" and insert --contemporaneously,-- therefor In Column 10, Line 47, delete "apples," and insert --applet,-- therefor In Column 11, Line 16, delete "(RTIC)," and insert --(RFIC),-- therefor In Column 12, Line 15, delete "2354," and insert --2354.-- therefor In Column 13, Line 30, delete "via." and insert --via-- therefor In Column 13, Line 53, delete "Evolution-Data." and insert --Evolution-Data-- therefor In Column 16, Line 37, after "computer", insert --to--

In Column 16, Line 54, delete "circuitry;" and insert --circuitry,-- therefor

In the Claims

In Column 17, Line 36, in Claim 1, delete "port;" and insert --port,-- therefor

In Column 17, Line 45, in Claim 1, delete "ma" and insert --may-- therefor

Signed and Sealed this
Sixteenth Day of May, 2023

Katherine Kelly Vidal
*Director of the United States Patent and Trademark Office*

In Column 19, Line 20, in Claim 21, delete "ma" and insert --may-- therefor

In Column 19, Line 27, in Claim 21, before "digital", delete "establish"

In Column 20, Line 2, in Claim 24, after "claim", insert --21,--